US008185502B2

(12) United States Patent
Irisawa et al.

(10) Patent No.: US 8,185,502 B2
(45) Date of Patent: May 22, 2012

(54) BACKUP METHOD FOR STORAGE SYSTEM

(75) Inventors: Misako Irisawa, Kawasaki (JP);
Nobuhiro Maki, Yokohama (JP);
Wataru Okada, Machida (JP); Hironori Emaru, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 359 days.

(21) Appl. No.: 12/490,956

(22) Filed: Jun. 24, 2009

(65) Prior Publication Data

US 2010/0274767 A1 Oct. 28, 2010

(30) Foreign Application Priority Data

Apr. 23, 2009 (JP) .................................. 2009-104645

(51) Int. Cl.
*G06F 7/00* (2006.01)
*G06F 17/00* (2006.01)
*G06F 13/00* (2006.01)
*G06F 13/28* (2006.01)

(52) U.S. Cl. ...................................... 707/654; 711/162
(58) Field of Classification Search .......... 707/609–673, 707/999.2, 999.201, 999.204; 711/161, 162, 711/154, 100
See application file for complete search history.

(56) References Cited

U.S. PATENT DOCUMENTS

| | | | | |
|---|---|---|---|---|
| 5,758,359 A * | 5/1998 | Saxon | ..................... | 707/999.204 |
| 6,839,819 B2 * | 1/2005 | Martin | ......................... | 711/162 |
| 7,085,904 B2 * | 8/2006 | Mizuno et al. | ............... | 711/162 |
| 7,120,769 B2 * | 10/2006 | Yagawa et al. | ............... | 711/162 |
| 7,185,340 B1 * | 2/2007 | Hersh | ......................... | 719/312 |
| 7,370,233 B1 | 5/2008 | Sobel et al. | | |
| 2002/0107901 A1 * | 8/2002 | Hay | ............................ | 709/102 |
| 2003/0131278 A1 * | 7/2003 | Fujibayashi | ..................... | 714/6 |
| 2003/0229753 A1 * | 12/2003 | Hwang | ........................ | 711/103 |
| 2005/0015416 A1 * | 1/2005 | Yamagami | .................... | 707/204 |
| 2006/0294238 A1 * | 12/2006 | Naik et al. | .................... | 709/226 |
| 2007/0245113 A1 * | 10/2007 | Shinozaki et al. | ........... | 711/170 |

OTHER PUBLICATIONS

"Understanding VMware Consolidated Backup," White Paper, VMware, 11 Sheets.

\* cited by examiner

*Primary Examiner* — Brent Stace
(74) *Attorney, Agent, or Firm* — Foley & Lardner LLP

(57) ABSTRACT

The present invention provides a backup method that makes it possible to specify the recovery-enabled time of an application even in a case where a backup has been performed without staticizing the application. In response to a first instruction from a management computer, a storage system backs up a first volume to a second volume at a first time while a first host computer continues to process an application. In response to a second instruction from the management computer, a second host computer reads out the data of the second volume and acquires a second time that is the time at which the application is recovery-enabled. The management computer stores the relationship between the backup and the second time in backup catalog information.

7 Claims, 25 Drawing Sheets

FIG. 3

| 160 16001 | 16002 | 16003 | 16004 | 16005 | 16006 |
|---|---|---|---|---|---|
| BACKUP ID | OSID | BACKUP TIME | APID | AP RECOVERY-ENABLED TIME | BACKUP DATA STORAGE VOLUME ID |
| BK_01 | OS_01 | 2008/12/04 12:00 | AP_01 | 2008/12/04 11:58 | Vol_03 |
| BK_02 | OS_01 | 2008/12/04 12:10 | AP_01 | 2008/12/04 12:05 | Vol_04 |
| BK_03 | OS_01 | 2008/12/04 12:20 | AP_01 | 2008/12/04 12:19 | Vol_05 |
| BK_04 | OS_02 | 2008/12/04 12:20 | AP_02 | 2008/12/04 12:19 | Vol_06 |
| | | | AP_03 | 2008/12/04 12:15 | Vol_06 |
| | | | AP_04 | 2008/12/04 12:16 | Vol_06 |
| BK_05 | OS_01 | 2008/12/04 12:30 | AP_01 | 2008/12/04 12:30 | Vol_07 |
| ... | ... | ... | ... | ... | ... |

FIG. 4

| AP ID 16101 | HOST ID 16102 | OSID 16103 | QUIESCENCE PROGRAM 16104 | STORAGE ID 16105 | USED VOL ID 16106 | RPO 16107 | RPO CORRECTION 16108 | PRIOR RECOVERY PROCESS PRIORITY 16109 | RECOVERY DATA SAVE 16110 |
|---|---|---|---|---|---|---|---|---|---|
| AP_01 | HOST_01 | OS_01 | YES | ST_01 | VOL_01 | 10 MINUTES | YES | 1 | YES |
| AP_02 | HOST_02 | OS_02 | YES | ST_02 | VOL_02 | 10 MINUTES | YES | 2 | YES |
| AP_03 | HOST_02 | OS_02 | YES | ST_02 | VOL_02 | 60 MINUTES | NO | 5 | YES |
| AP_04 | HOST_02 | OS_02 | YES | ST_02 | VOL_02 | 20 MINUTES | YES | 4 | YES |
| AP_05 | HOST_02 | SO_02 | YES | ST_02 | VOL_03 | 10 MINUTES | YES | 3 | YES |
| ... | ... | ... | ... | ... | ... | ... | ... | ... | ... |

VOLUME INFORMATION (120)

| STORAGE APPARATUS ID | VOLUME ID | AVAILABILITY |
|---|---|---|
| ST_01 | Vol_01 | NO |
| ST_01 | Vol_02 | NO |
| ST_01 | Vol_03 | NO |
| ST_01 | Vol_04 | NO |
| ST_01 | Vol_05 | NO |
| ST_01 | Vol_06 | NO |
| ST_01 | Vol_07 | YES |
| ST_02 | Vol_01 | NO |
| ... | ... | ... |

COPY PAIR INFORMATION

| COPY PAIR ID | PRIMARY STORAGE APPARATUS ID | PRIMARY VOL ID | SECONDARY STORAGE APPARATUS | SECONDARY VOL ID | COPY TYPE |
|---|---|---|---|---|---|
| PAIR_01 | ST_01 | Vol_01 | ST_01 | Vol_03 | FULL COPY |
| PAIR_02 | ST_01 | Vol_01 | ST_01 | Vol_04 | FULL COPY |
| PAIR_03 | ST_01 | Vol_01 | ST_01 | Vol_05 | FULL COPY |
| PAIR_04 | ST_01 | Vol_01 | ST_01 | Vol_06 | FULL COPY |
| PAIR_05 | ST_01 | Vol_02 | ST_02 | Vol_01 | DIFFERENCE COPY |
| ... | ... | ... | ... | ... | ... |

FIG. 8

| BACKUP CONDITION SETUP SCREEN | ☒ |
|---|---|

801      \<BACKUP TARGET\>

| APID | AP_02 |
|---|---|

802      \<BACKUP POLICY\>

| | | |
|---|---|---|
| COPY TYPE | ~803 | FULL COPY |
| PRO | ~804 | 10 MINUTES |
| RPO CORRECTION PROCESS | ~805 | YES |
| PRIOR RECOVERY PROCESS PRIORITY | ~806 | 2 |
| PRIOR RECOVERY DATA | ~807 | SAVED |

808     809

| SET | CANCEL |
|---|---|

FIG. 17

| SCHEDULE ID | BACKUP START TIME | OSID | VMID | COPY PAIR ID |
|---|---|---|---|---|
| SC_01 | 2008/12/04 12:00:00 | OS_01 | VM_01 | PAIR_01 |
| SC_02 | 2008/12/04 12:10:00 | OS_01 | VM_01 | PAIR_02 |
| SC_03 | 2008/12/04 12:20:00 | OS_01 | VM_01 | PAIR_03 |
| ... | ... | ... | ... | ... |

FIG. 18

| BACKUP ID | OSID | VMID | BACKUP TIME | APID | AP RECOVERY-ENABLED TIME | BACKUP DATA STORAGE VOLUME ID |
|---|---|---|---|---|---|---|
| BK_01 | OS_01 | VM_01 | 2008/12/04 12:00 | AP_01 | 2008/12/04 11:58 | Vol_03 |
| BK_02 | OS_01 | VM_01 | 2008/12/04 12:10 | AP_01 | 2008/12/04 12:05 | Vol_04 |
| BK_03 | OS_01 | VM_01 | 2008/12/04 12:20 | AP_01 | 2008/12/04 12:19 | Vol_05 |
| BK_04 | OS_02 | VM_02 | 2008/12/04 12:20 | AP_02 | 2008/12/04 12:19 | Vol_06 |
| BK_04 | OS_02 | VM_02 | 2008/12/04 12:20 | AP_03 | 2008/12/04 12:15 | Vol_06 |
| BK_04 | OS_02 | VM_02 | 2008/12/04 12:20 | AP_04 | 2008/12/04 12:16 | Vol_06 |
| ... | ... | ... | ... | ... | ... | ... |

FIG. 19A

| APID | HOST ID | OSID | OS QUIESCENCE PROGRAM | VMID | VM QUIESCENCE PROGRAM |
|---|---|---|---|---|---|
| AP_01 | HOST_01 | OS_01 | YES | VM_01 | YES |
| AP_02 | HOST_02 | OS_02 | YES | VM_01 | YES |
| AP_03 | HOST_02 | OS_02 | YES | VM_01 | YES |
| AP_04 | HOST_02 | OS_02 | YES | VM_01 | YES |
| AP_05 | HOST_02 | SO_02 | YES | VM_01 | YES |
| ... | ... | ... | ... | ... | ... |

FIG. 19B

| APID | STORAGE ID | USED-VOL ID | RPO | RPO CORRECTION | PRIOR RECOVERY PROCESS PRIORITY | RECOVERY DATA SAVE |
|---|---|---|---|---|---|---|
| AP_01 | ST_01 | VOL_01 | 10 MINUTES | YES | YES | YES |
| AP_02 | ST_02 | VOL_02 | 10 MINUTES | YES | YES | YES |
| AP_03 | ST_02 | VOL_02 | 60 MINUTES | NO | YES | YES |
| AP_04 | ST_02 | VOL_02 | 20 MINUTES | YES | YES | YES |
| AP_05 | ST_02 | VOL_03 | 10 MINUTES | YES | YES | YES |
| ... | ... | ... | ... | ... | ... | ... |

BACKUP METHOD FOR STORAGE SYSTEM

CROSS-REFERENCE TO RELATED APPLICATIONS

This application relates to and claims priority from Japanese Patent Application No. 2009-104645 filed on Apr. 23, 2009, the entire disclosure of which is incorporated herein by reference.

BACKGROUND OF THE INVENTION

1. Field of the Invention

The present invention relates to a storage system, and more particularly to a backup method for data used by a computer system application.

2. Description of the Related Art

Data utilized by an application (will be called "AP" hereinafter) in a host computer may be lost in accordance with "a failure of the storage apparatus", "the destruction of data by a computer virus", and "user error". A "backup" for saving this data as a copy is implemented in a storage apparatus in preparation for a case in which this data is lost. When data used by the AP is lost, the storage apparatus executes a "recovery" to recover the backed up data.

There are various methods for backing up data. One such backup method uses the copy function of the storage apparatus to reduce the impact on the work host computer resulting from a backup. In a case where a data write is generated in accordance with this copy function to the primary storage area of the storage apparatus being used by the AP, the same write data is also written to a secondary storage area inside the same storage apparatus. That is, it is possible to create a secondary storage area for storing data corresponding to the data stored in the primary storage area at all times. Then, when this copy function is split at a certain point in time, it is possible to create in the secondary storage area backup data related to the data stored in the primary storage area at the point in time that the copy function was split.

To recover the data at the point of recovery, this data must be saved in a state in which the consistency of the data is maintained. In order to maintain data consistency, the AP is generally "in quiescent statein quiescent state". The "quiescence" of the AP is a process in which updated data inside memory is forcibly outputted to disk after suspending the reception of a new transaction related to the pertinent AP. Since AP-specific processing is required in this process, backup software that cooperates with the backup-targeted AP must be available. Furthermore, AP "quiescence" also requires that work processing be suspended for a fixed period of time, lowering work efficiency.

The time at which an AP is able to be recovered using a recovery process (called the "recovery-enabled time" hereinafter) is a function of the backup time. Normally, the backup time is the time at which the backup target was in quiescent state. This time makes it possible to manage the Recovery Point Objective (called the "RPO" hereinafter) when the system suspends operations at the time of a failure. RPO signifies a target point in time up until which data is able to be recovered when data loss and system suspension occur.

One means for acquiring a backup without carrying out AP quiescence is a technique that makes use of server virtualization technology. Server virtualization technology is technology that uses one server computer to construct one or more virtual computers (hereinafter, called either a "virtual server" or a "Virtual Machine (VM)"). Then, respectively different OS and AP may be run on the plurality of virtual servers. In a case where a backup is performed in VM units, the backup is carried out using a VM quiescence function similar to that for the AP. For this reason, when acquiring a VM backup using server virtualization technology, it is possible to backup the AP data residing on the VM without using AP-specific backup software.

As the prior art, the specification for U.S. Pat. No. 7,370,233 and "Understanding VMware Consolidated Backup," VMware, 2007 are known.

When a backup is performed in VM units as in the prior art, since the AP on the VM is not in quiescent state, there may be a case where an AP-related transaction process is backed up midway through the transaction. When this occurs, the transaction process may be performed over again at recovery in accordance with an AP recovery process (for example, a rollback), and the VM backup time and the AP recovery time can differ.

Up until now, a user carried out an AP recovery by referencing a backup catalog and indicating the data of the time to which he wished to return. However, in a case where a backup is performed in VM units by staticizing the AP, the problem has been that only the VM backup time is capable of being managed and the AP recovery time is indiscernible even by referencing the backup catalog. Accordingly, for the user, this gave rise to the problem that processing that depended on the recovery time, such as AP recovery time-based recovery management, could not be carried out.

Similarly, the backup start time and the AP recovery time may differ when a backup has been executed without staticizing the AP even when the backup is not executed in VM units. For this reason, the problem has been that the user is not able to carry out processing that depends on the recovery time, such as AP recovery time-based recovery management.

SUMMARY OF THE INVENTION

A computer system for solving the above-mentioned problems has a first host computer for executing an application; a second host computer; a storage system, which is coupled-coupled to the first host computer and the second host computer, and which has a plurality of storage devices that form a plurality of volumes including a first volume that is allocated to the application; and a management computer, which manages the first host computer, the second host computer and the storage system, and which issues a first instruction to the storage system and issues a second instruction to the second host computer, and is characterized in that the storage system, in response to the first instruction, backs up a first volume to a second volume at a first time while the first host computer continues to process the application, the second host computer, in response to the second instruction, reads out data of the second volume and acquires a second time, which is the time at which the application is recovery-enabled, and the management computer stores the relationship between the backup and the second time in backup catalog information.

Further, a backup method for solving the above-mentioned problems is a backup method by a management computer coupled coupled to a first host computer for executing an application; a second host computer; and a storage system having a plurality of storage devices that form a plurality of volumes including a first volume that is allocated to the application, and is characterized in that an instruction is issued to the storage system to back up a volume to a second volume at a first time while the first host computer continues to process the application, a second computer reads out data of the second volume, and acquires a second time, which is the time at which an acquired application is recovery-enabled, and the relationship between the backup and the second time is stored in backup catalog information.

BRIEF DESCRIPTION OF THE DRAWINGS

FIG. 3 is a diagram showing an example of backup catalog information of this embodiment;

FIG. 4 is a diagram showing an example of AP configuration information of this embodiment;

FIG. 5 is a diagram showing an example of storage management information of this embodiment;

FIG. 8 is a diagram showing an example of a backup condition setup screen of this embodiment;

FIG. 17 is a diagram showing an example of backup schedule information of the third embodiment;

FIG. 18 is a diagram showing an example of backup catalog information of the third embodiment;

FIG. 19 is a diagram showing an example of AP configuration information of the third embodiment;

DESCRIPTION OF THE PREFERRED EMBODIMENTS

Figure 1:
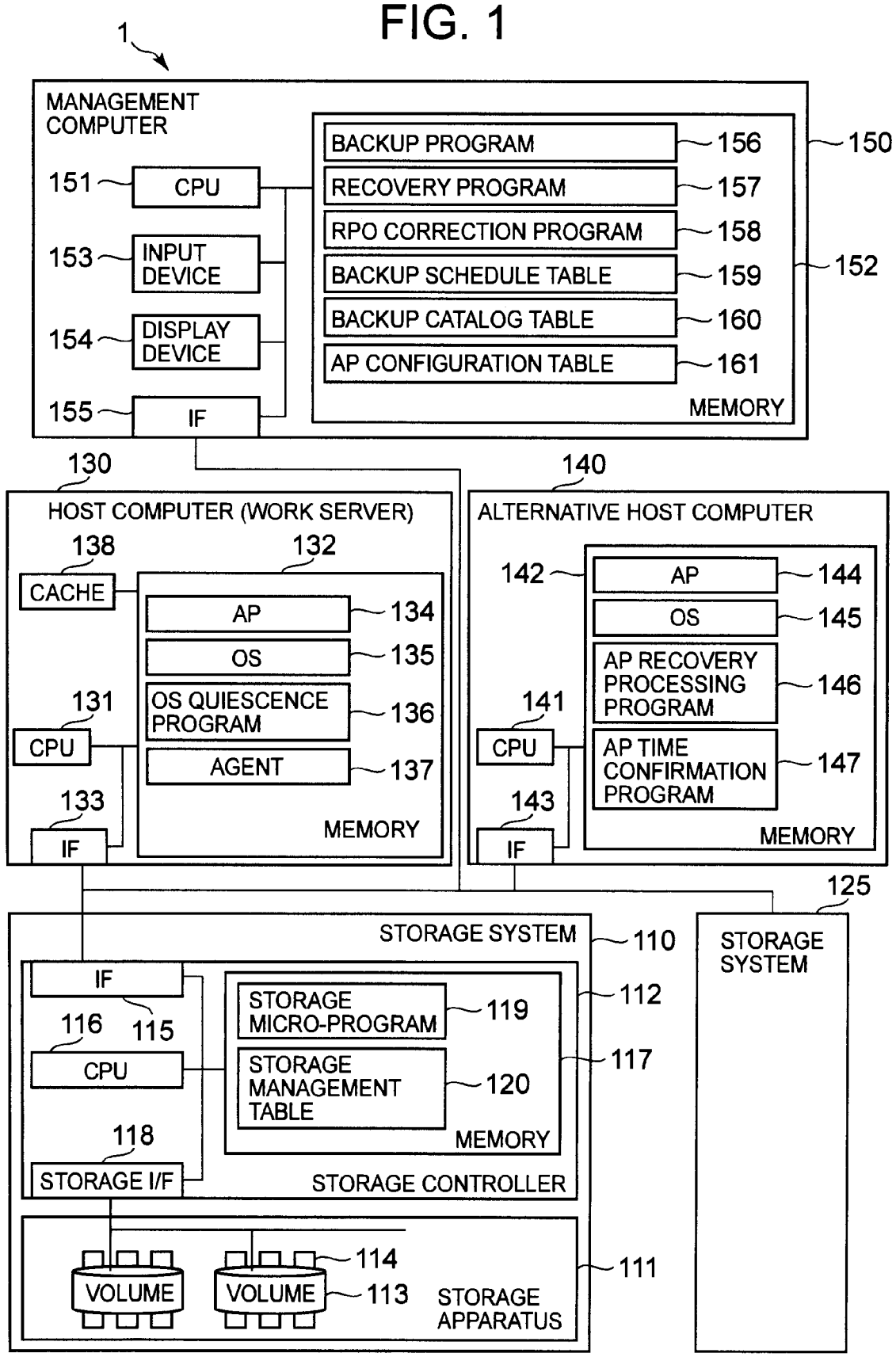
FIG. 1 is a diagram showing an example of the configuration of a computer system 1 of a first embodiment.

The embodiments will be explained hereinbelow while referring to the drawings.

First Embodiment

First, a first embodiment of the present invention will be explained using FIG. 1.

FIG. 1 is an example of a diagram showing the configuration of a computer system related to the first embodiment of the present invention.

The computer system 1 of the first embodiment is configured from a storage system 110; a host computer (work server) 130; an alternative host computer 140; and a management computer 150. In the first embodiment, in addition to the storage system 110, one or more storage system 125 is coupled to the host computer (work server) 130, the alternative host computer 140 and the management computer 150. However, the computer system 1 is not limited to this storage system configuration. The computer system 1 may be configured by at least one or more storage systems. Furthermore, the computer system 1 of the first embodiment is configured such that the host computer 130 and the management computer 150 are individual computers. However, the present invention is not limited to this configuration, and the host computer 130 and the management computer 150 may be configured as the same computer having the same functions. The storage system 110, the host computer 130, the alternative host computer 140 and the management computer 150, for example, are coupled via a LAN or other such network from respective network interfaces (I/F hereinafter) (a storage system 110 I/F 115, a host computer 130 I/F 133, an alternative host computer 140 I/F 143, and a management computer 150 I/F 155).

The storage system 110 comprises a storage apparatus 111 for storing data; and a controller 112 for controlling the storage system 110. The storage apparatus 111 is coupled to the controller 112 by way of a storage I/F 118.

The storage apparatus 111 comprises at least one or more storage devices 114. The storage device 114 is a typical hard disk drive, but the present invention is not limited thereto, and the storage device 114 may also be a flash memory or other such storage medium. The storage device has a physical storage area for storing data read and written by a computer (for example, the host computer 130). A volume 113 is a logical storage area to which the physical storage area has been allocated, and is a (host computer recognizable) storage area provided to the host computer. For example, the volume 113 may be realized by constructing a RAID Group from a plurality of storage devices, and allocating the storage area included in the RAID Group to this volume 113, but the present invention is not limited thereto. Further, in this embodiment, data utilized by an AP 134 on the host computer 130 is stored in this volume.

The controller 112 comprises an I/F 115 for connecting to the host computer 130, which issues an I/O (Input/Output) request related to a data read/write, and to the management computer 150, which manages the storage system; a memory 117; a CPU 116 for controlling an I/O request; and a storage I/F 118, which is coupled to the storage apparatus 111 for carrying out communications. Here, an I/O request comprises a read request and a write request, and the write request comprises write data. In this embodiment, the I/F 115 is configured from a single I/F. However, I/F 115 may be respectively arranged for each communication mode (for example, IP (Internet Protocol) communications with the management computer 150 and FC (Fibre Channel) communications with the host computer 130). Further, an I/F for connecting to and communicating with the management computer 150 and an I/F for connecting to and communicating with the host computer 130 may also be respectively arranged even for the same communication mode. The memory 117 stores a storage micro-program 119 and storage management information 120 that is managed by the storage micro-program 119. The CPU 116 is a processor for executing a program stored in the memory 117. The CPU 116 reads out and executes the storage micro-program 119, and manages the configuration of the storage apparatus 111. For example, the CPU 116 realizes a function for copying data stored in the volume 113 to another volume, and a function for allowing the host computer 130 to recognize the volume 113, which is a logical storage area, via the I/F 115. The storage management information 120 is storage system configuration information and other such information utilized by the storage micro-program 119, and, for example, is managed using a table. An example of storage management information 120 will be explained by referring to FIG. 5.

The host computer 130 is able to recognize the volume 113, which is the logical storage area of the storage system 110, and issues an I/O request to this volume via an I/F 133. The host computer 130 comprises a CPU 131; a memory 132; the I/F 133; and a cache 138. The CPU 131 is a processor for executing a program stored in the memory 132. The memory 132 stores an application (hereinafter AP) 134, an operating system (hereinafter, OS) 135, an OS quiescence program 136, and an agent 137. The AP 134 is a program that runs on the host computer 130 and executes a task. At least one or more AP 134 is stored in the memory 132. The OS 135 is basic software that runs on the host computer 130 and manages the computer as a whole. The OS quiescence program 136 is for staticizing the OS. OS quiescence is the process for forcibly outputting updated information inside the memory to a disk after reception of a new transaction related to this OS has been suspended. Carrying out this process makes it possible to maintain OS consistency. The agent 137 has a function for specifying the configuration of the AP running on the host computer 130 and the volume that the AP is using, and notifying same to the management computer. The I/F 133 is coupled by way of a network to the storage system 110, the alternative host computer 140, which will be described hereinbelow, and the management computer 150. A separate I/F 133 may be arranged for each communication mode (for example, TCP/IP communications with the management computer 150 and the alternative host computer 140, and FC communications with the storage system 110). Further, an I/F for connecting to and communicating with the management computer 150, an I/F for connecting to and communicating with the alternative host computer 140, and an I/F for connecting to and communicating with the storage system 110 may also be respectively arranged even for the same communication mode. The cache 138 is a storage area for temporarily saving data prior to storing the data in the volume 113 of the storage system 110 when the AP 134 data in the memory 132 has been altered.

The alternative host computer 140 is for carrying out and verifying a recovery subsequent to backing up data that is used by the host computer 130 AP and stored in the storage system 110 volume. The alternative host computer 140 comprises a CPU 141; a memory 142; and an I/F 143. The CPU 141 is a processor for executing a program stored in the memory 142. The memory 142 stores the same types of AP 144 and OS 145 as the AP 134 and OS 135 stored in the memory 132 of the host computer 130. Therefore, the alternative host computer 140 is able to provide the same AP and OS conditions as the host computer 130. The memory 142 stores an AP recovery processing program 146 for carrying out an AP recovery process and an AP time confirmation program 147 for confirming the latest AP update time when recovering backup data.

The management computer 150 comprises a CPU 151; a memory 152; an input device 153; a display device 154; and an I/F 155. The input device 153 is for a user (administrator) to input data, and, for example, is a keyboard or mouse. The display device 154 is for displaying a backup condition setup screen (FIG. 8) and a recovery setup screen (FIG. 13) to the user, and, for example, is a CRT or other such screen display device. The CPU 151 is a processor for executing a program stored in the memory 152. The memory 152 stores a backup program 156, a recovery program 157, a RPO correction program 158, backup schedule information 159, backup catalog information 160, and AP configuration information 161.

The backup program 156 backs up the volume 113 used by the AP 134 in a secondary volume, and creates the backup catalog information. The recovery program 157 uses the AP recovery processing program of the alternative host computer 140 to recover the backup data of the data stored in the volume 113 utilized by the AP 134. The RPO correction program uses the AP time confirmation program on the alternative host computer 140 to correct a RPO that has been set. Furthermore, the running of these programs will be described in detail hereinbelow using flowcharts and the like.

Next, the respective information referenced in this embodiment will be explained.

Figure 2:
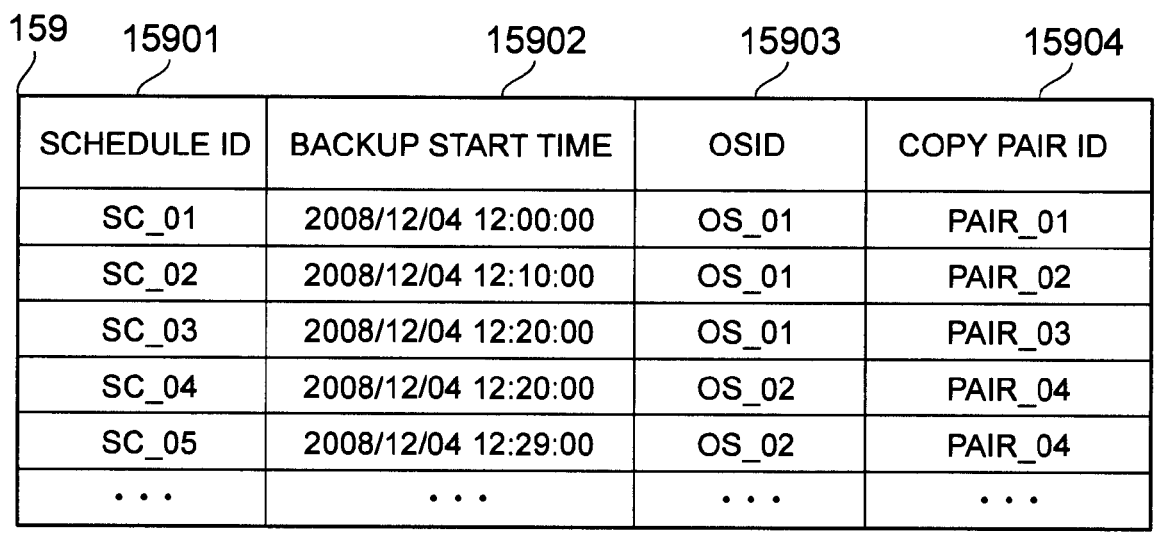
FIG. 2 is a diagram showing an example of backup schedule information of this embodiment.

FIG. 2 shows an example of backup schedule information 159 stored in the memory 152 of the management computer 150. Furthermore, the format of the backup schedule information 159 described in FIG. 2 is one example, but the present invention is not limited to the format shown in FIG. 2. The backup schedule information 159 is referenced in accordance with the backup program 156 executed by the management computer 150.

In the backup schedule information 159, there is stored a schedule ID 15901, a backup start time 15902, an OS ID 15903, and a copy pair ID 15904. Information (for example, identifiers) for identifying the respective backup schedules is stored in the schedule ID 15901. A backup start time is stored in the backup start time 15902. Information (for example, an identifier) for identifying the OS that uses the backup-targeted volume is stored in the OS ID 15903. Information (for example, an identifier) for identifying a primary/secondary volume copy pair is stored in the copy pair ID 15904. Using the copy pair ID to reference copy pair information 1202 included in storage management information 120 (FIG. 5) makes it possible to acquire the primary/secondary volume ID being used by a copy pair.

FIG. 3 shows an example of backup catalog information 160 stored in the memory 152 of the management computer 150. Furthermore, the format of the backup catalog information 160 described in FIG. 3 is an example, and the present invention is not limited to the format shown in FIG. 3. The backup catalog information 160 is referenced by the backup program 156 and the recovery program 157 executed by the management computer 150.

In the backup catalog information 160 there is stored a backup ID 16001, an OS ID 16002, a backup time 16003, an AP ID 16004, an AP recovery-enabled time 16005, and a backup data storage volume ID 16006. Information (for example, an identifier) for identifying each backup is stored in the backup ID 16001. Information (for example, an identifier) for identifying the OS that uses the backup-targeted volume is stored in the OS ID 16002. A backup start time is stored in the backup start time 16003. Information (for example, an identifier) for identifying the AP that uses the backup-targeted volume is stored in the AP ID 16004. In a case where the host computer 130 uses the backed up secondary volume to recover the AP, the time when the AP is recovery-enabled is stored in the AP recovery-enabled time 16005. Information (for example, an identifier) for identifying the volume (secondary volume) that stores the data backed up from the backup-targeted volume is stored in the backup data storage volume ID 16006.

Managing the backup time 16003 as well as the AP recovery-enabled time 16005 enables the user (administrator) to know the precise AP recovery-enabled time even when a backup was performed without staticizing the AP.

FIG. 4 shows an example of AP configuration information 161 stored in the memory 152 of the management computer 150. Furthermore, the format of the AP configuration information 161 described in FIG. 4 is an example, and the present invention is not limited to the format shown in FIG. 4. AP configuration information 161 is referenced by the backup program 156 executed by the management computer 150.

Figure 10:
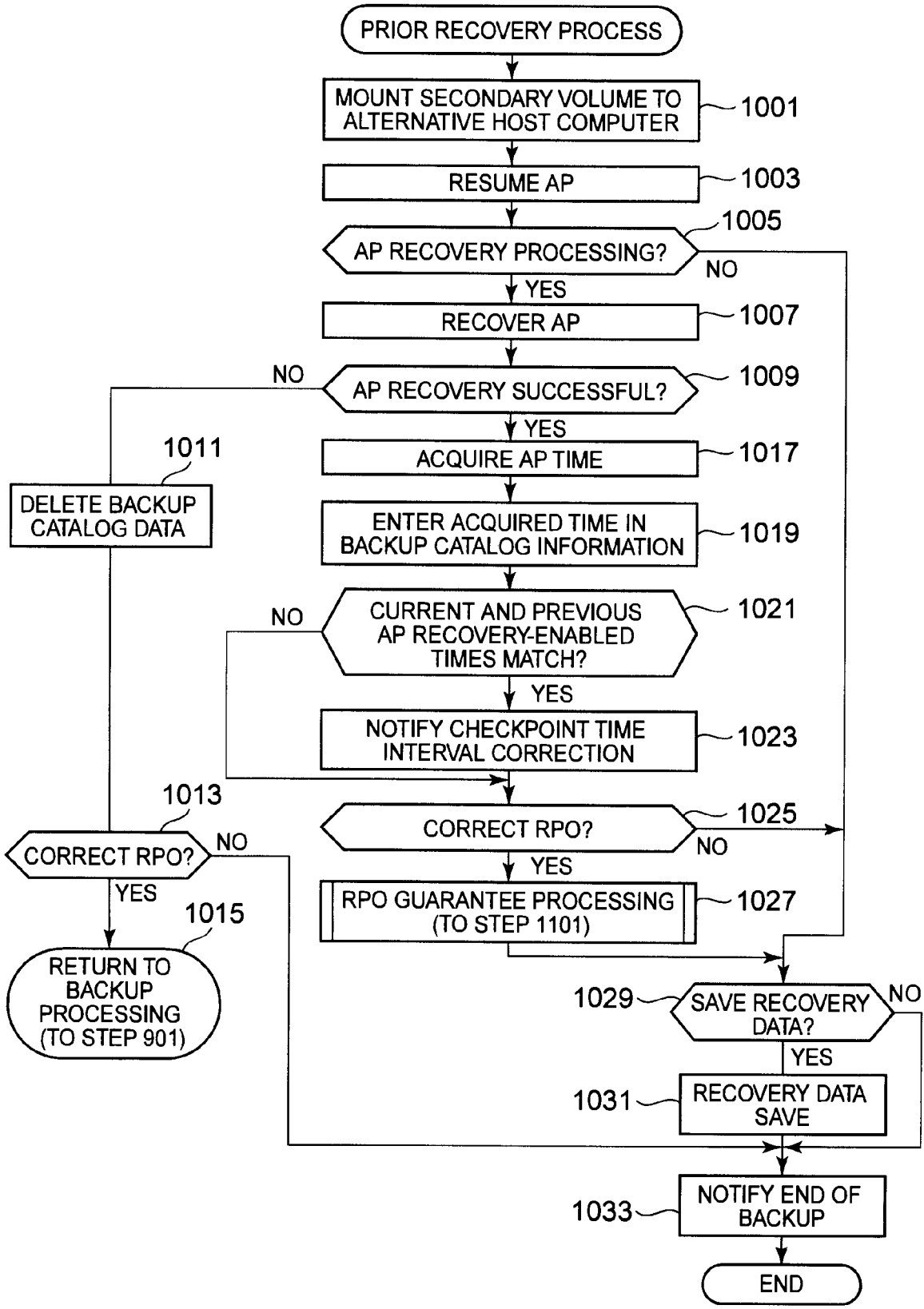
FIG. 10 is a diagram showing an example of a prior recovery process flowchart of this embodiment.

In the AP configuration information 161 there is stored an AP ID 16101, a host ID 16102, an OS ID 16103, quiescence program 16104, a storage ID 16105, a used-VOL ID 16106, a RPO 16107, RPO correction 16108, a prior recovery process priority 16109, and a recovery data save 16110. Information (for example, an identifier) for identifying the application is stored in the AP ID 16101. Information (for example, an identifier) for identifying the host computer running the AP is stored in the host ID 16102. Information (for example, an identifier) for identifying the OS that serves as the platform for executing the AP is stored in the OS ID 16103. Information denoting whether or not there is a program for staticizing the OS that serves as the platform for executing the AP is stored in quiescence program 16104. Information (for example, an identifier) for identifying the volume used by the application is stored in the used-VOL ID 16106. A RPO, which is the information for guaranteeing data up until a certain point in time, is stored in RPO 16107. This time becomes the time interval during which a backup of the volume used by the application is taken. Information as to whether or not the RPO correction process shown in FIG. 11 will be executed is stored in RPO correction 16108. The order of priority in which a prior recovery process is to be carried out in a case where a plurality of AP has been backed up simultaneously is stored in the prior recovery process priority 16109. Information as to whether or not the prior recovery process shown in FIG. 10 is to be executed is stored in recovery data save 16110.

The information stored in the AP configuration information 161 is acquired in accordance with the agent 137 of the host computer 130, and stored in the memory 152 of the management computer 150. Furthermore, the RPO 16107, RPO correction 16108, prior recovery process priority 16109, and recovery data save 16110 are stored on the basis of information that the user inputted via the "backup condition setup" screen shown in FIG. 8. These RPO 16107, RPO correction 16108, prior recovery process priority 16109, and recovery data save 16110 may also be specified beforehand.

The method for acquiring the information stored in the AP configuration information 161 is an example, and the present invention is not limited thereto.

FIG. 5 shows an example of storage management information 120 stored in the memory 112 of the storage system 110. Furthermore, the format of the storage management information 120 described in FIG. 5 is an example, and the present invention is not limited to the format shown in FIG. 5. The storage management information 120 is referenced by the storage micro-program executed by the storage system 110, and by the backup program 156 executed by the management computer 150. The storage management information 120 comprises volume information 1201 and copy pair information 1202.

The volume information 1201 is configured from a storage apparatus ID 12011, a volume ID 12012, and availability 12013. Information (for example, an identifier) for identifying a storage apparatus 111 is stored in the storage apparatus ID 12011. Information (for example, an identifier) for identifying the volume included in the storage apparatus 111 is stored in the volume ID 12012. Information denoting whether or not a volume is able to be used is stored in availability 12013. In availability 12013, for example, information denoting "Yes" is stored for a volume that is not being used at all, that is, a volume that is not currently being used by any of the AP. This includes not only unused volumes, but also volumes that have a usage history, but which are not currently being used. A volume for which information denoting "Yes" is stored may be used as the secondary volume when the construction of a new copy pair has been instructed.

The copy pair information 1202 comprises a copy pair ID 12021, a primary storage apparatus ID 12022, a primary VOL ID 12023, a secondary storage apparatus ID 12024, a secondary VOL ID 12025, and a copy type 12026. Information (for example, an identifier) for identifying a primary/secondary volume copy pair is stored in the copy pair ID 12021. Information (for example, an identifier) for identifying the primary storage apparatus in a copy pair is stored in the primary storage apparatus ID 12022. Information (for example, an identifier) for identifying the primary volume in a copy pair is stored in the primary VOL ID 12023. Information (for example, an identifier) for identifying the secondary storage apparatus in a copy pair is stored in the secondary storage apparatus ID 12024. Information (for example, an identifier) for identifying the secondary volume in a copy pair is stored in the secondary VOL ID 12025. Information denoting the type of copy between a copy pair is stored in the copy type 12026.

<Backup Management Process>

Next, a backup management process related to this embodiment will be explained using FIGS. 6 through 13.

Figure 6:
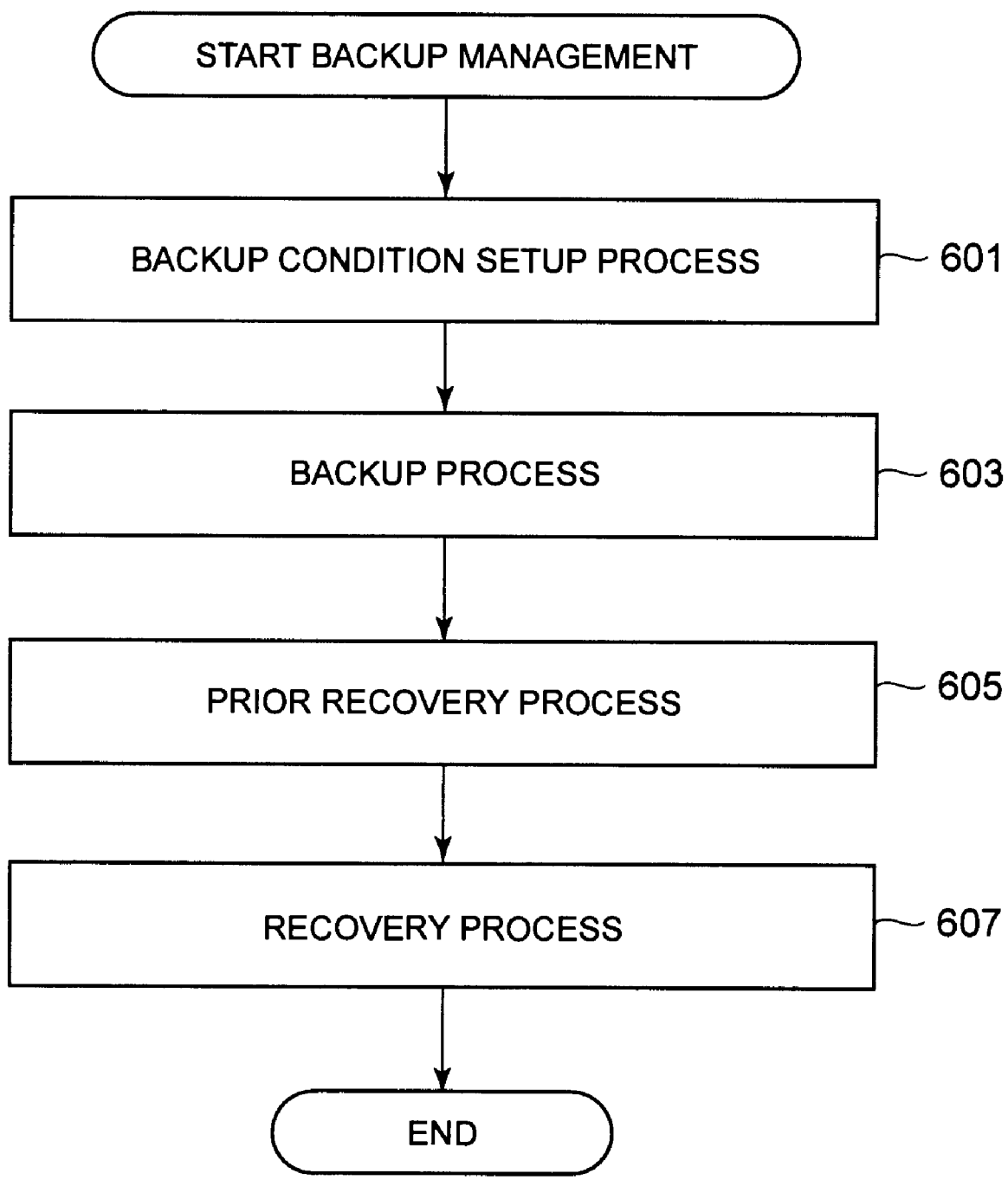
FIG. 6 is a diagram showing an example of a backup management flowchart of this embodiment.

FIG. 6 is a flowchart showing an example of a process for managing the AP backup time in a case where a backup is to be acquired without carry out an AP quiescence. AP "quiescence" is the process for forcibly outputting updated information inside memory to a disk subsequent to suspending the reception of a new transaction related to the pertinent AP.

In FIG. 6, the processing from Step 601 through Step 607 is realized by the CPU 151 executing the backup program 156 stored in the memory 152 of the management computer 150. However, the respective processing from Step 601 through Step 607 also includes processing in accordance with the program described hereinbelow. The processing of the programs stored in the respective memories is realized by the CPU reading out from memory and executing the respective programs. There are cases hereinbelow when the explanation uses the program as the subject, but the CPU, which is the processor that executes this program, actually executes this program and carries out the processing.

In Step 603, processing is performed in accordance with the OS quiescence program 136 stored in the memory 132 of the host computer 130. In Step 605, the processing is performed in accordance with the recovery program 157 stored in the memory 152 of the management computer 150, and the AP recovery processing program 146 and AP time confirmation program 147 stored in the memory 142 of the alternative host computer 140. In Step 607, the processing is performed in accordance with the recovery program 157 stored in the memory 152 of the management computer 150.

However, specifically which processing step is realized in accordance with which program is arbitrarily determined by system design requirements, and is not limited to the above.

The backup condition setup process of Step 601 sets the conditions at the time the backup is executed. The detailed operations of Step 601 will be explained by referring to FIG. 7.

In the backup processing of Step 603, a backup is executed based on the backup conditions set in Step 601. The detailed operations of Step 603 will be explained by referring to FIG. 9.

In the prior recovery processing of Step 605, backed up data is recovered beforehand using the alternative host computer 140. Then, the AP recovery-enabled time is confirmed, and the backup catalog information 160 is corrected. The detailed operations of Step 605 will be explained by referring to FIG. 10.

In the recovery processing of Step 607, the backup ID specified by the user is referenced, and the recovery of the backup data is performed. The detailed operations of Step 607 will be explained by referring to FIG. 12.

<Backup Condition Setup Process>

Figure 7:
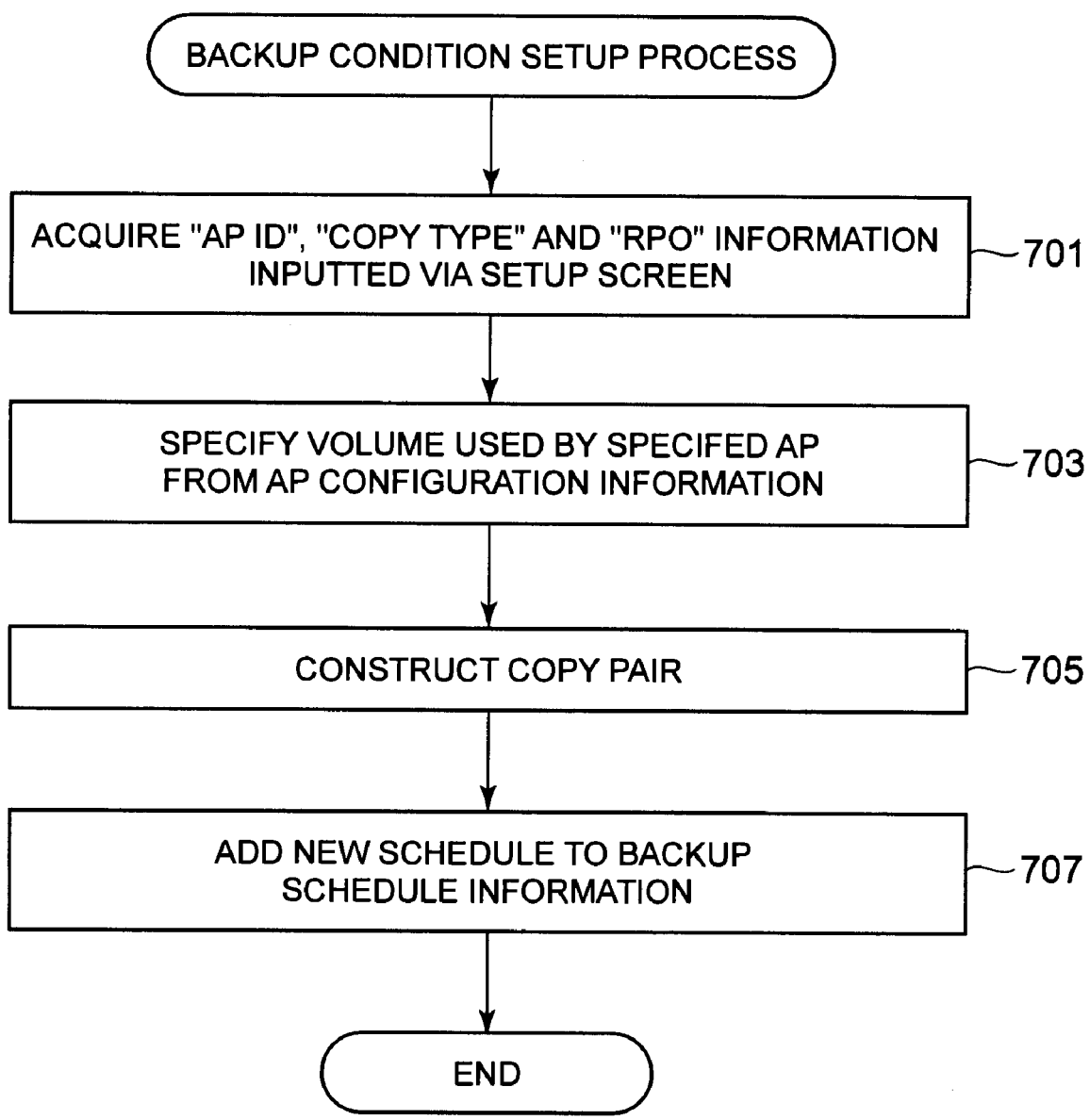
FIG. 7 is a diagram showing an example of a flowchart of a backup condition setting process of this embodiment.

FIG. 7 shows an example of the flow of processing (condition setup processing) for setting up the backup conditions to be used at backup. The backup program 156 receives a backup request from the user, displays the backup condition setup screen and commences processing.

In Step 701, the backup program 156 acquires the user-inputted AP ID, copy type, RPO and other such information from the backup condition setup screen. Then, the backup program 156 corrects the AP configuration information 161 based on the acquired information.

FIG. 8 shows an example of the backup condition setup screen. The format of the backup condition setup screen disclosed in FIG. 8 is an example, and the present invention is not limited to the format shown in FIG. 8. The backup condition setup screen comprises an item 801 for specifying the "AP ID" (AP identification information) that determines the backup target; an item 802 for inputting a backup policy; a set button 808; and a cancel button 809 for canceling the backup condition settings.

Figure 11:
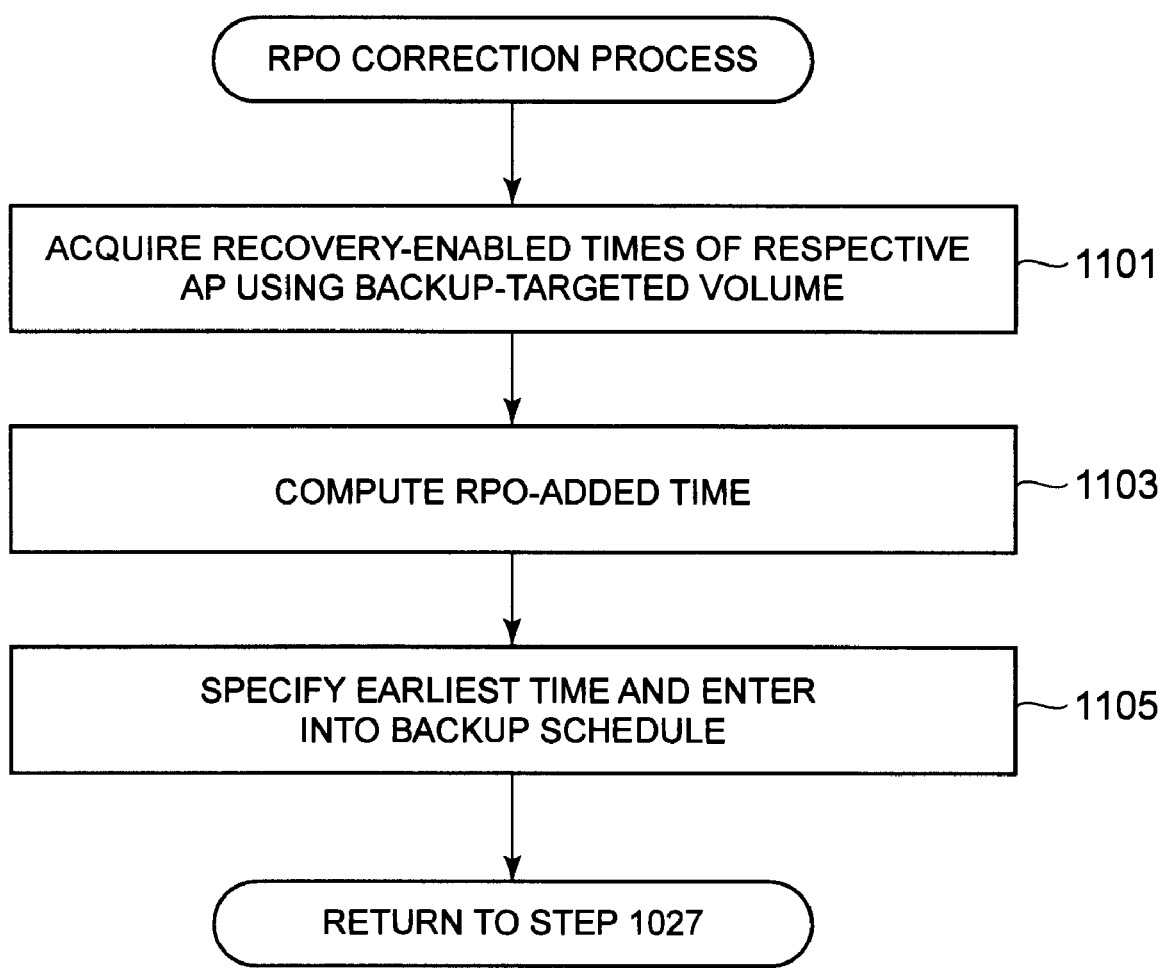
FIG. 11 is a diagram showing an example of a RPO correction process flowchart of this embodiment.

In item 801, which specifies the "AP ID" (AP identification information) that determines the backup target, the user selects the AP ID that will be the backup target. Actually, it is the volume that is used by the backup-targeted AP that is backed up. The backup policy 802 comprises the respective items of copy type 803; RPO 804; RPO correction processing 805; prior recovery processing priority 806; and save prior recovery data 807. Either "full copy" or "difference copy" is inputted into copy type 803 as the type of copy. The RPO of the AP specified in AP ID 801 is inputted into RPO 804. Information indicating whether or not the RPO correction process shown in FIG. 11 is to be carried out is inputted into RPO correction processing 805. In a case where a plurality of AP has been backed up simultaneously, the order of priority in which prior recovery processing is to be carried out is inputted into the prior recovery processing priority 806. Information indicating whether or not to save the data of the prior recovery processing of FIG. 10 is inputted into prior recovery data 807.

In the example of the backup condition setup screen of FIG. 8, the conditions are set such that "a full-copy backup of the volume used by AP_02 will be carried out at 10 minute intervals, and RPO correction processing will also be performed. The prior recovery processing priority is 2. Data recovered during prior recovery processing will be saved." Then, in a case where the AP_02 of AP ID 16101 in the AP configuration information 161 of FIG. 4 is referenced and there is a change in the conditions, the RPO 16107, RPO correction 16108, prior recovery processing priority 16109, and recovery data save 16110 items are corrected.

In Step 703, the backup program 156 uses the AP configuration information 161 to retrieve the AP ID corresponding to the AP ID acquired in Step 701. Then, the backup program 156 references the used-VOL ID 16106 of the AP configuration information 161 and specifies the volume this is being used by the retrieved AP ID. In a case where AP_02 is specified via the backup condition setup screen as in FIG. 8, AP ID 16101 and the corresponding used-VOL ID 16106 of the AP configuration information 161 are referenced, and the volume to be used by AP_02 is specified as being VOL_02.

In Step 705, the storage micro-program 119 of the storage system 110 constructs a copy pair. In the construction of this pair, the storage micro-program 119 creates a setup file for operating a pair function. Specifically, the storage micro-program 119 sets the volume used by the AP specified in Step 703 as the primary volume (the backup source volume), retrieves a "Yes" volume from availability 12013 of the volume information 1201 of FIG. 5, and sets the retrieved volume as the secondary volume (the backup destination volume). The secondary volume here may also be specified by the user. Then, the storage micro-program 119 adds the information of the newly constructed copy pair to the copy pair information 1202. Furthermore, the storage micro-program 119 also sets the information of the availability 12013 in the volume information 1201 to "No" for the volume that has been set as the secondary volume. In the example of FIG. 8, the storage micro-program 119, for example, adds PAIR_04 to the copy pair information 1202. The storage micro-program 119 also changes the availability 12013 of VOL_06 of the volume ID 12012 in the volume information 1201 from "Yes" to "No".

When the primary volume and secondary volume copy pair is constructed, the AP of the host computer 130 executes a write process to the data inside the primary volume, and when the data inside the primary volume is updated, copies this primary volume updated data to the secondary volume.

In Step 707, the backup program 156 acquires the copy pair information and adds a new schedule to the backup schedule information 159. In the example of FIG. 8, SC_04 is added to schedule ID 15901 of the backup schedule information 159 as a new schedule. The OS ID 16103 of the AP configuration information 161 is referenced, an OS, which serves as the platform for the AP specified in the backup condition setup screen, is specified, and information denoting OS_02 is stored in the OS ID 15903. Information denoting PAIR_04, which was specified as the PAIR added anew in Step 705, is stored in the copy pair ID 15904.

<Backup Process>

Figure 9:
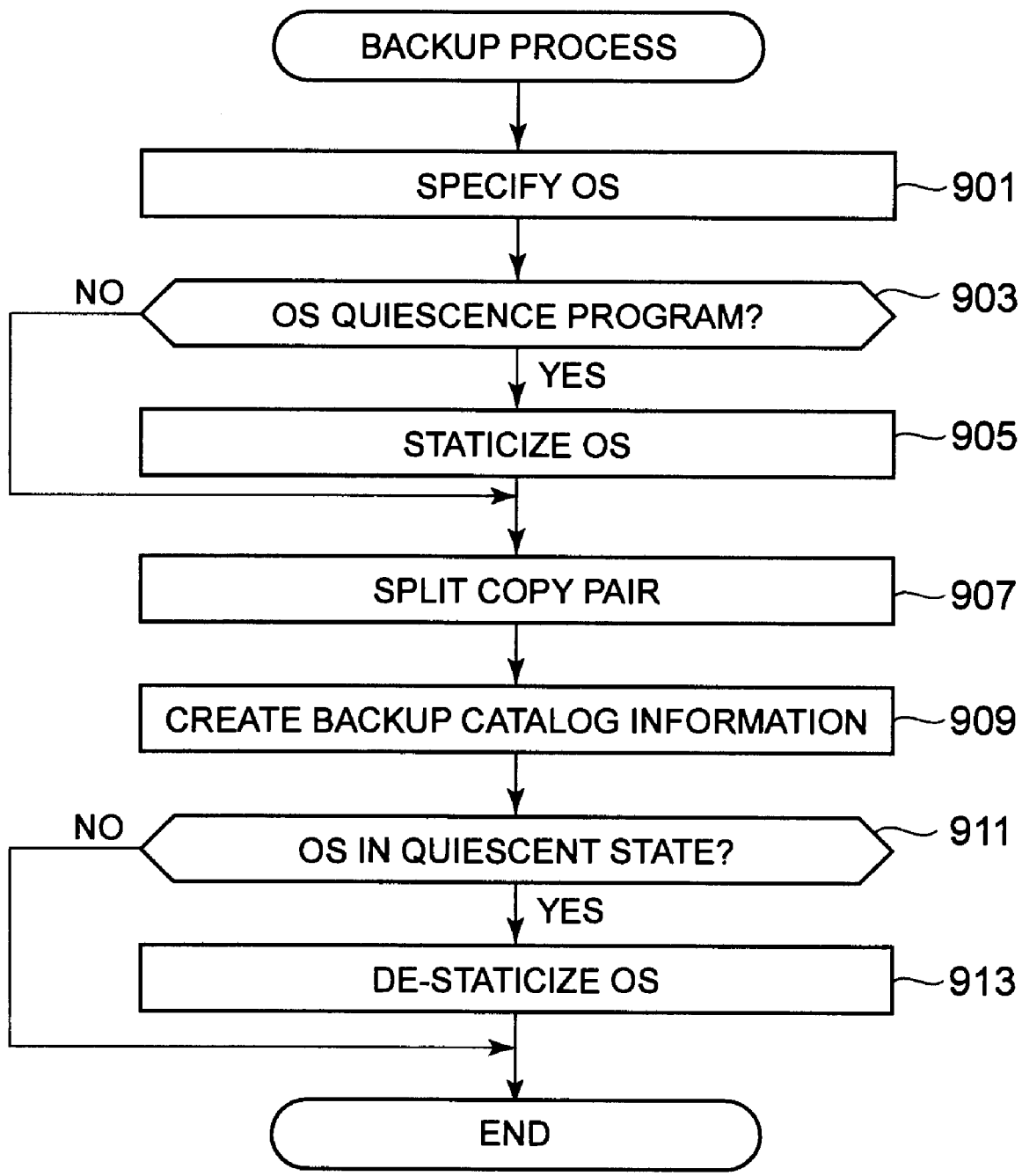
FIG. 9 is a diagram showing an example of a backup process flowchart of this embodiment.

FIG. 9 shows an example of the backup processing flow in this embodiment. The backup program 156 carries out backup processing in accordance with the backup conditions set in Step 601. The respective backup processes are executed at the backup start time 15901 of the backup schedule information 159. However, backup processing may also be executed on demand.

In Step 901, the backup program 156 confirms the OS on which the backup-targeted AP will run. Specifically, the backup program 156 specifies an OS in accordance with the OS ID 15903 from the backup schedule information 159 of FIG. 2.

In Step 903, the backup program 156 confirms whether or not there is an OS quiescence program 136 in the specified OS. Specifically, the backup program 156 checks for the OS quiescence program 136 by referencing quiescence program 16104 of the AP configuration information 161. When the OS quiescence program exists (When Step 903 is YES), processing proceeds to Step 905. When an OS quiescence program does not exist (When Step 903 is NO), processing moves to Step 907.

In Step 905, the backup program 156 uses the OS quiescence program 136 and performs quiescence for the OS specified in Step 901.

In Step 907, the storage micro-program 119 splits the copy pair denoted by copy pair ID 15904 of the backup schedule information 159. A split denotes suspending the execution of processing for constructing a copy pair and copying primary volume data changes to the secondary volume. When a data write has been generated to the storage area of the storage being used by the AP, the copy function writes the same data to a different storage area inside the same storage. By so doing, it is possible to create an area in which the same data is stored at all times. For this reason, when a split is carried out, the data of the primary volume at the time of the split may be saved to the secondary volume as backup data, making it possible to create backup data of this point in time in the copy-destination storage area.

AP "quiescence" is not executed prior to the copy pair split here. By not performing AP "quiescence", there is no need to maintain a quiescence program for each AP. Further, since it is not necessary to perform AP quiescence at the copy pair split, the AP is able to continue executing a task.

In Step 909, the backup program 156 adds information related to the secondary volume, which is the volume in which the backup data has been saved, to the backup catalog information 160 of FIG. 3. Specifically, the backup ID 16001, the OS ID 16002, the backup time 16003, the AP ID 16004, and the backup data storage volume ID 16006 are added to the backup catalog information 160.

For example, it is supposed from the backup schedule information 159 that SC_01 of the schedule ID 15901 commenced at 12:00:00 on 2008 Dec. 4. In a case where an OS quiescence program exists in Step 903, OS_01 from the OS ID 15903 is in quiescent state in Step 905. In Step 907, the primary volume and the secondary volume of PAIR_01 from the copy pair ID 15904 are split. Subsequent to the end of the split, BK_01 is added to the backup catalog information 160 as a new backup ID 16001, OS_01 is stored in the OS ID 16002, 12:00:00 on 2008 Dec. 4 is stored in the backup time 16003, AP_01 is stored in the AP ID 16004, and VOL_03, which was specified from PAIR_01 of the copy pair information 15904, is stored in the backup storage volume ID 16006.

In Step 911, a determination is made as to whether or not the OS was in quiescent state. In a case where the OS has been in quiescent state (When Step 911 is YES), processing proceeds to Step 912, and in a case where quiescence has not been carried out (When Step 911 is NO), backup processing ends.

In Step 912, the backup program 156 de-staticizes the OS. Performing this process commences the reception of the transaction suspended in Step 905.

<Prior Recovery Process>

FIG. 10 shows an example of the prior recovery processing flow in this embodiment. The AP 144 of the alternative host computer 140 is used to execute the prior recovery processing for the secondary volume data backed up in Step 603, and AP verification is executed. The prior recovery process is started in response to an instruction by the recovery program 157 to carry out prior recovery processing after the backup program 156 has detected the end of backup processing.

In Step 1001, the recovery program 157 mounts the secondary volume specified from the backup storage volume ID 16006 of the backup catalog information 160 to the alternative host computer 140. "Mount the secondary volume to the alternative host computer" signifies the creation of a state in which the secondary volume is recognizable from the alternative host computer.

In Step 1003, the recovery program 157 references the data in the mounted secondary volume, executes AP 144 and resumes the AP.

In Step 1005, a determination is made as to whether or not AP recovery processing occurs. In this embodiment, since a backup of a volume being used by the AP is carried out without stopping the AP from performing a task, the backup is carried out without staticizing the AP. Therefore, an AP recovery process may occur. The AP determines whether or not an AP recovery process occurs by determining via an AP log if an AP recovery process has occurred or not. Information on the AP history and on data written out by the AP is described in the AP log. In a case where an AP recovery process has occurred (when Step 1005 is YES), the processing of Step 1007 is executed. In a case where AP recovery processing does not occur (when Step 1005 is NO), the processing of Step 1029 is executed.

In Step 1007, the AP recovery processing program 146 of the alternative host computer 140, which has received an instruction from the recovery program 157 of the management computer 150, carries out a crash recovery, a rollback or other such AP recovery process. In a case where the application is storing a history of data changes, the AP recovery process uses this history to carry out repairs until consistency is maintained.

In Step 1009, a determination is made as to whether or not the AP recovery process was successful. For example, the AP log is checked to determine whether the AP recovery process was successful or not. In a case where the AP recovery processing program 146 was not able to recover the AP (Step 1009: NO), Step 1011 is executed. In a case where the AP recovery processing program 146 was able to recover the AP (Step 1009: YES), Step 1017 is executed.

First, the processing in a case where it was determined in Step 1009 that AP was able to be recovered (Step 1009: YES) will be explained.

In Step 1017, the backup program 156 issues an instruction to the AP time confirmation program 147 of the alternative host computer 140 to acquire the time at which restoration was possible in accordance with the crash recovery, rollback or other such AP recovery process (recovery-enabled time).

In Step 1019, the backup program 156 updates the recovery-enabled time acquired in Step 1017 in the AP recovery-enabled time 16005 of the backup catalog information 160. For example, in the case of BK_01 of the backup ID 16001, the backup program 156 describes 2008 Dec. 4 11:58 in the AP recovery-enabled time 16005. Managing the AP recovery-enabled time separately from the time at which the backup starts makes it possible to manage the recovery in accordance with the AP recovery time.

In Step 1021, the AP recovery-enabled time when the volume to be used by the backup-targeted AP was backed up previously (in the past) is compared against the AP recovery-enabled time acquired in Step 1017. Specifically, in a case where a prior recovery process is performed for BK_05 of the backup catalog information, BK_01, which is a backup of the same volume used by the same AP, is referenced and the BK_05 recovery-enabled time is compared against the BK_01 recovery-enabled time. When the two recovery-enabled times match (Step 1021: YES), Step 1023 is executed.

When the two recovery-enabled times do not match (Step 1021: NO), Step 1025 is executed.

In Step 1023, the recovery program 157 notifies of a correction to a checkpoint time interval such that a checkpoint is generated during the time of the RPO. In a case where the application data has changed, the data is temporarily saved to cache 138, and stored in the volume at the checkpoint. For this reason, the checkpoint guarantees that all committed processing is being reflected in the volume. It is conceivable that processing performed during a user-specified RPO time period is not reflected in a data file because the AP data, which is the result of the AP recovery process, returned to the same time as the previous backup time. Correcting the checkpoint interval makes it possible to store a backup of the volume used by the AP during the RPO time period. Furthermore, Steps 1021 and 1023 need not be carried out.

Instead of a notification about the checkpoint time interval correction, the recovery program 157 may notify that it is better to correct the RPO longer because the backup data is the same as that of the previous time.

In Step 1025, a determination is made as to whether or not the AP RPO will be corrected. Specifically, the RPO correction 16108 of the AP configuration table 161 is checked, and a determination of YES is made when information denoting "yes" is stored, and a determination of NO is made when information denoting "no" is stored. In a case where an AP RPO correction process is to be carried out (Step 1025: YES), Step 1027 is executed. In a case where an AP RPO correction process is not to be carried out (Step 1025: NO), Step 1029 is executed.

In Step 1027, the time at which the next backup will start is computed based on the AP recovery-enabled time confirmed in the prior recovery process (Step 605) and the AP RPO specified by the user, and the backup schedule information 159 is corrected. The detailed operations of Step 1027 will be explained by referring to FIG. 11.

In Step 1027, processing advances to Step 1101 of the RPO correction process of FIG. 11. The RPO correction process is executed by the RPO correction program 158 of the management computer 150.

In Step 1101, the RPO correction program 158 references the AP configuration information 161, and retrieves all the APs that utilize the backed up volume. Then, the RPO correction program 158 references the backup catalog information 160 and acquires the recoverable times of the retrieved AP.

In Step 1103, the RPO correction program 158 computes a time obtained by adding the RPO specified from the RPO 16107 of the AP configuration information 161 to the respective AP recovery-enabled times acquired in Step 1101.

In Step 1105, the RPO correction program 158 selects the earliest time of the start times for the next backup computed in Step 1103. Then, the RPO correction program 158 stores the selected time in the backup start time 15902 of the backup schedule information 159 as the next backup start time. According to the RPO correction process, it is possible to hasten the backup start time and protect the RPO even when recovery processing occurs in the AP and the recovery-enabled time is old.

For example, it is clear from the used-VOL ID 16106 of the AP configuration information 161 of FIG. 4 that data used by three APs, i.e. AP_02, AP_03 and AP_04 of AP ID 16101, is stored in VOL_02. It is also clear from RPO correction 16108 that RPO correction processing is required for two APs, i.e. AP_02 and AP_04.

Then, the RPO correction program 158 adds the RPO 16107 of the AP configuration information 161 to the AP recovery-enabled time 16005 of the backup catalog information 160. In accordance with this, 10 minutes is added to 2008 Dec. 4 12:19 of the AP_02 to make it 2008 Dec. 4 12:29, and 20 minutes is added to 2008 Dec. 4 12:16 of the AP_04 to make it 2008 Dec. 4 12:36. Comparing the two, the earliest time is 2008 Dec. 4 12:29. Accordingly, the RPO correction program 158 corrects the backup start time 15902 of SC_05 of the schedule ID 15901 from 12:30 to 12:29. Subsequent to correction, the RPO correction program 158 returns to Step 1027 of the prior recovery process of FIG. 10, and processing proceeds to Step 1029.

In Step 1029, a determination is made as to whether or not the state of the AP recovered in Step 1007 (the prior recovery state) has been saved. Specifically, the recovery data save 16108 of the AP configuration information 161 is referenced, and a determination of YES is made when it is "yes", and a determination of NO is made when it is "no". In a case where the AP-recovered state has been saved (Step 1029: YES), Step 1031 is executed. In a case where the AP-recovered state has not been saved (Step 1029: NO), Step 1033 is executed.

In Step 1031, the recovery program 157 saves the AP recovered state, for example, to the volume for which the availability 12013 from the volume information 120 is "Yes". Saving the AP recovered state makes it possible to speed up recovery since there is no need to carry out recovery processing when an actual recovery process is performed.

Next, the processing in a case where the determination in Step 1009 was that the AP was unable to be recovered (Step 1009: NO) will be explained. Since the AP could not be recovered, the backup process failed.

In Step 1011, the data that was added to the backup catalog information 160 in Step 909 is deleted. The data in the secondary volume where the backup data is stored may also be deleted at the same time. Deleting the data from the backup catalog information 160 makes it possible for the user to disable selection of this backup recovery. This can prevent the erroneous selection of a volume for which AP recovery is not possible. Also, since the volume for which recovery is not possible will not be able to be used thereafter, deleting the data stored therein makes possible the effective utilization of the volume area.

In Step 1013, a determination is made as to whether or not the AP RPO will be corrected. Specifically, RPO correction 16108 of the AP configuration table 161 is checked, and a determination of YES is made when information denoting "yes" is stored, and a determination of NO is made when information denoting "no" is stored. In a case where an AP RPO correction process is carried out (Step 1013: YES), processing proceeds to Step 1015. The RPO has not yet been guaranteed at this point in time, but backup processing is resumed in Step 1015 in order to bring the recovery-enabled time a little closer to the RPO. Accordingly, processing returns to the backup process (Step 901). In a case where an AP RPO correction process is not to be performed (Step 1013: NO), processing advances to Step 1033.

In Step 1033, end of backup is notified, and backup processing ends.

In a case where there is a plurality of volumes for which backup processing ends at the same time here, the prior recovery process priority 16109 of the AP configuration information 161 may be referenced, and prior recovery processing may be executed in order from the highest priority. However, processing may also be carried out in order without setting priorities. For example, in the example of FIG. 4, the prior recovery processing priority 16109 is 1 for AP_01 and 2 for AP_02. In a case where backup ends at the same time for AP_01 and AP_02, prior recovery processing is carried out first for AP_01, which has a high prior recovery processing priority 16109. Using a priority to perform processing makes it possible to preferentially carry out prior recovery processing of a volume for which a high level of importance was set by the user.

<Recovery Process>

Figure 12:
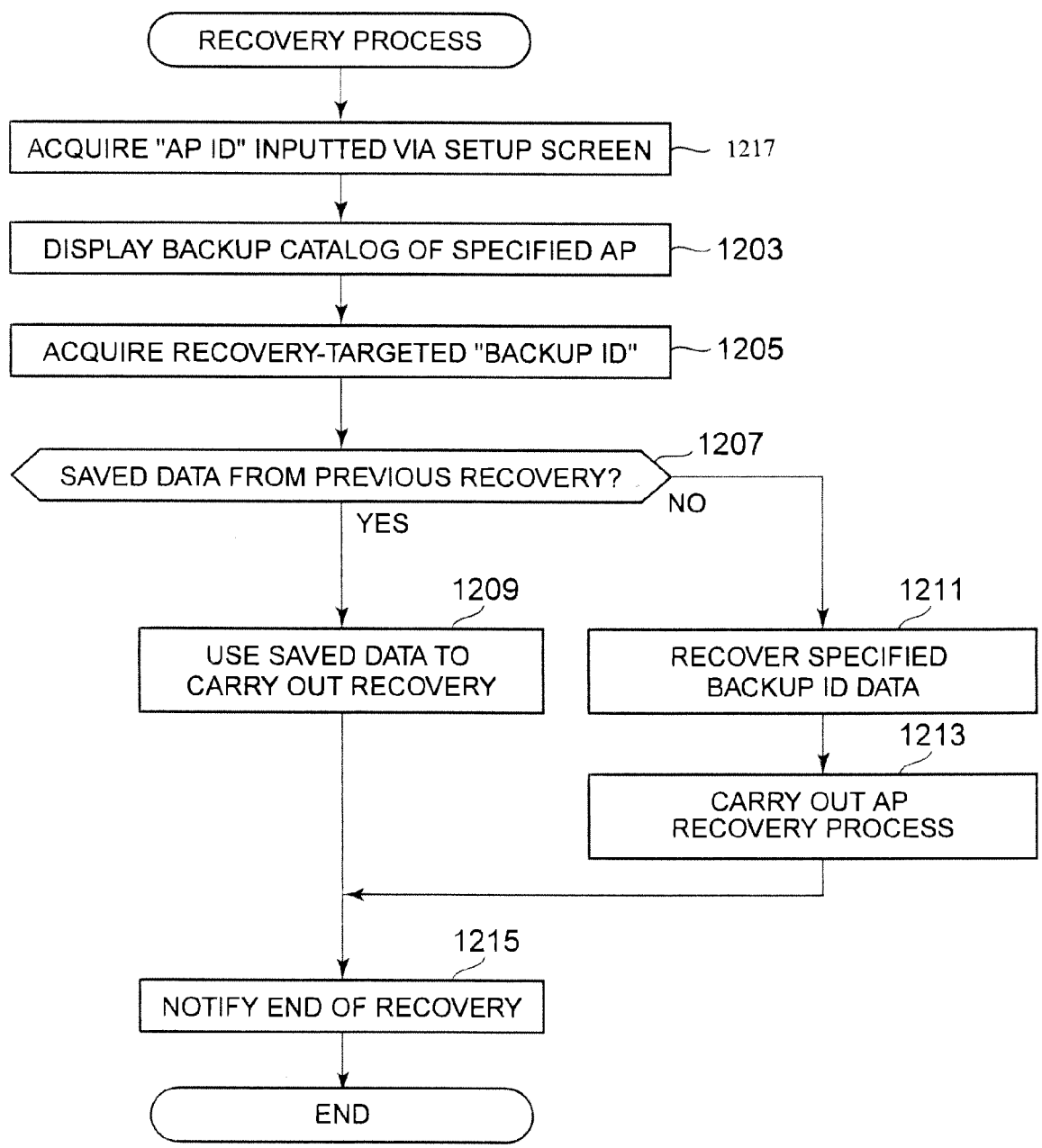
FIG. 12 is a diagram showing an example of a recovery process flowchart of this embodiment.

FIG. 12 shows an example of the flow of a recovery process in this embodiment. In a case where the user, for example, requests a recovery for an AP that is using a secondary volume by performing inputting via the recovery setup screen shown in FIG. 13, the recovery program 157 of the management computer 150 starts a recovery process.

In Step 1217, the recovery program 157 acquires AP information by causing the user to input the ID of the AP to be recovered into the recovery setup screen.

In Step 1203, the recovery program 157 retrieves the backup IDs that match the specified AP from the AP ID 16004 of the backup catalog information 160, and displays these matches as a backup catalog list.

Figure 13:
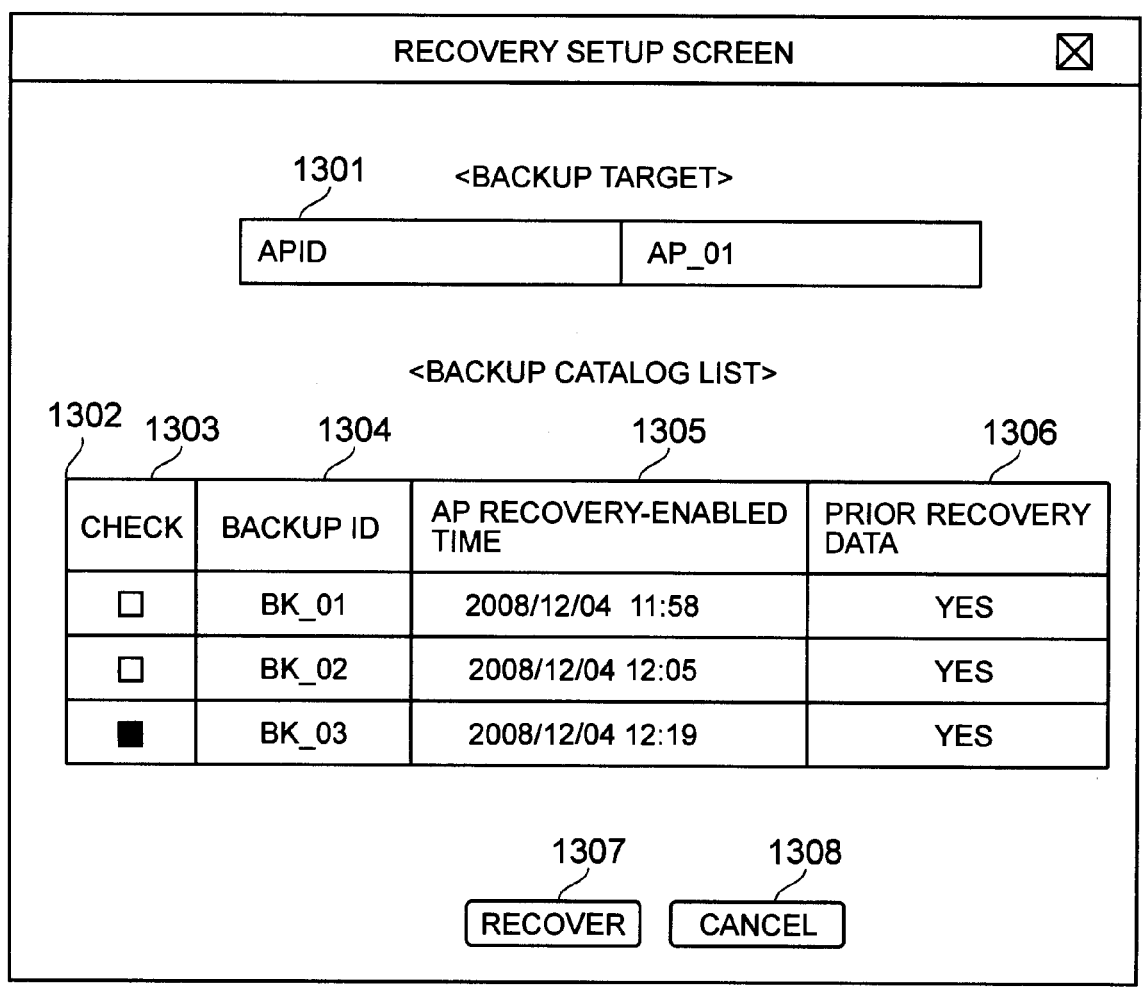
FIG. 13 is a diagram showing an example of a recovery setup screen of this embodiment.

An example of the recovery setup screen of this embodiment is shown in FIG. 13. The format of the recovery setup screen disclosed in FIG. 13 is an example, and the present invention is not limited to the format shown in FIG. 13. The screen of FIG. 13 comprises an item 1301 for specifying the recovery-targeted AP ID; a backup catalog list 1302; a recovery button 1307; and a cancel button 1308 for canceling a recovery process.

The user inputs information identifying the AP to be recovered into the item 1301 for specifying the recovery-targeted AP ID. The backup catalog list 1302 comprises a recovery-enabled backup ID 1304; the recovery-enabled time of the AP 1305; prior recovery data 1306; and a check item 1303 for selecting a recovery backup catalog. The backup catalog list 1302 is created by the recovery program 157 by referencing the backup catalog information 160 and the AP configuration information 161. Since AP_01 is specified as the recovery-targeted AP ID 1301 in the example of FIG. 13, the recovery program 157 references the AP ID 16004 of the backup catalog information 160, and displays BK_01, BK_02 and BK_03 of the backup ID 16001, which match up with AP_01. The prior recovery data 1306 is referenced from the recovery data save 16110 of the AP configuration information 161.

In Step 1205, the recovery program 157 acquires the information of the recovery-targeted backup ID selected by the user from the backup catalog list 1302 of the recovery setup screen. In the example of FIG. 13, BK_03, which has been selected in accordance with the check 1303, becomes the recovery-targeted backup ID.

In Step 1207, a determination is made as to whether or not the AP-recovered state was saved in Step 1029 of FIG. 10. In a case where the AP-recovered state has been saved (Step 1207: YES), Step 1209 is executed. In a case where the AP-recovered state has not been saved (Step 1207: NO), Step 1211 is executed.

In Step 1209, the data saved in Step 1029 of FIG. 10 is used to recover and restore the data on the host computer 130.

In Step 1211, recovery must be carried out once again on the host computer 130 since the data recovered in the prior recovery process has not been saved.

In Step 1213, the data of the specified backup ID is recovered, and the AP recovery processing program 146 is used to carry out an AP recovery process.

In the example of FIG. 13, it is possible to return to the AP data of Dec. 4, 2008 12:19.

Lastly, a recovery end notification is performed in Step 1215, and processing ends.

Second Embodiment

Next, a second embodiment of the present invention will be explained. This embodiment differs from the first embodiment in that the storage system included in the computer system comprises a NAS (Network Attached Storage). In this embodiment, a case in which the present invention is applied to the backup management of a volume used by an AP under NAS conditions will be explained by focusing on the differences with the configuration of FIG. 1.

A NAS OS is stored in the memory 1416 of the NAS 1413 of the storage system, and the NAS 1413 functions as a file server.

Figure 14:
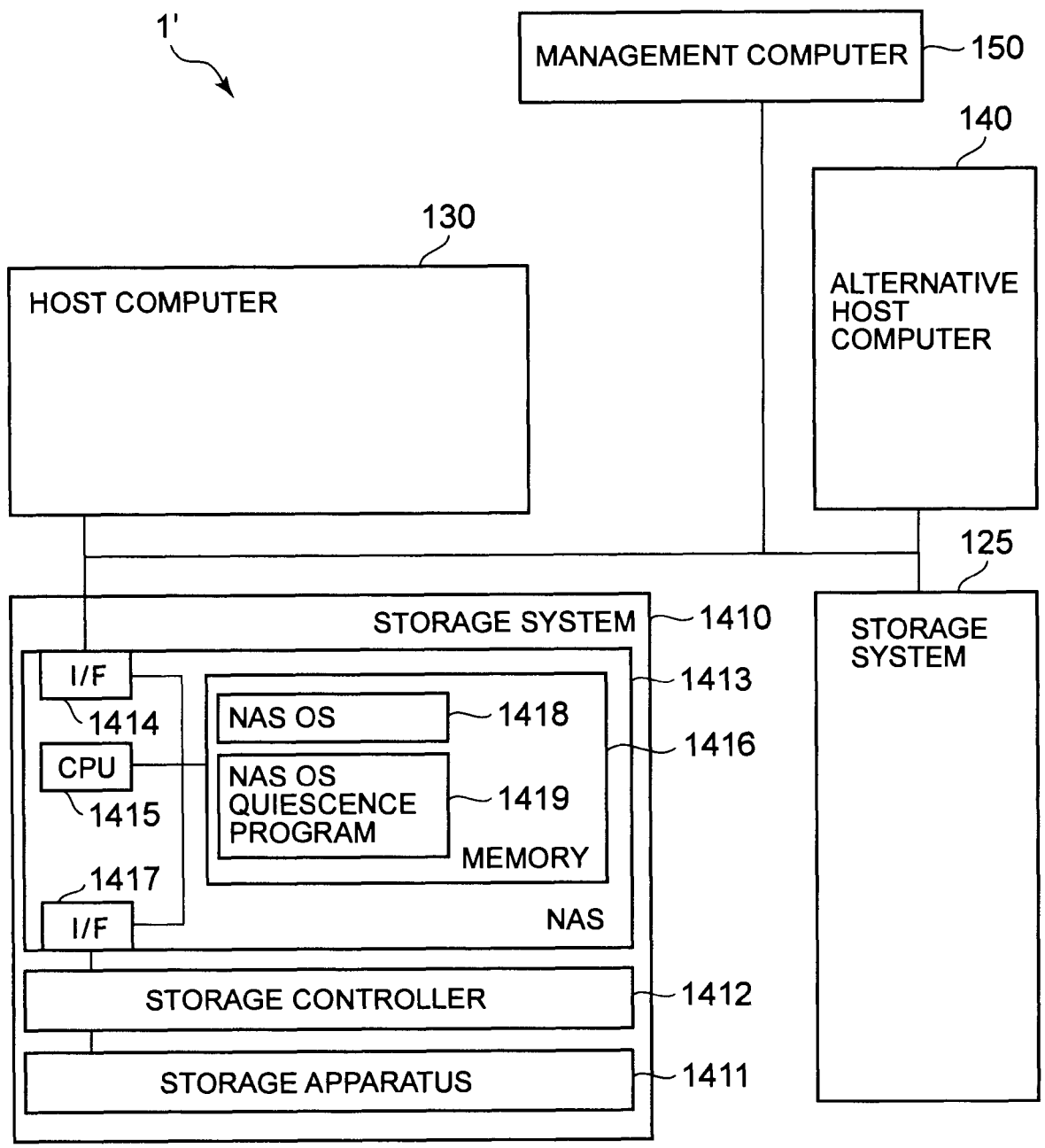
FIG. 14 is a diagram showing an example of the configuration of the computer system of a second embodiment.

FIG. 14 shows an example of a system block diagram of a computer system 1' comprising a NAS 1413 related to this embodiment. As shown in FIG. 14, the computer system 1' of this embodiment is configured from a storage system 1410; a host computer 130; an alternative host computer 140; and a management computer 150 the same as the computer system 1 of FIG. 1. The storage system 1410, which differs from that of FIG. 1, will be explained below.

The storage system 1410 comprises a NAS 1413 in addition to a storage apparatus 1411 and a controller 1412.

The storage apparatus 1411 is the same as the storage apparatus 111 of FIG. 1.

The controller 1412 is the same as the controller 112 of FIG. 1.

The NAS 1413 is configured from an I/F 1414 coupled to the host computer 130 via a network; a CPU 1415; the memory 1416; and an I/F 1417 coupled to the controller 1412. The memory 1416 stores an OS for the NAS (NAS OS) 1418, and a NAS OS quiescence program 1419 for the NAS OS. The NAS OS 1418 is able to provide the host computer 130 with a storage area like a disk drive, for example. The NAS OS quiescence program 1419 carries out the "quiescence" of the NAS OS 1418 the same as the OS quiescence program 136 of the first embodiment. The function of the NAS OS quiescence program 1419 is realized in accordance with being read out and executed by the CPU 1415. The NAS 1413 may be in the storage system 1410 as in FIG. 14, or it may be on another computer.

Next, the respective information referenced in this embodiment will be explained. The various types of information used in this embodiment are the same as the information recorded in the respective information shown in FIGS. 2 through 5 related to the first embodiment. However, it is supposed that the OS referred to in this embodiment is a NAS OS 1418 on a NAS 1413, and that the OS quiescence program is a NAS OS quiescence program 1419 on the NAS 1413. Specifically, the OS ID 15903 of the backup schedule information 159, the OS ID 16002 of the backup catalog information 160, and the OS ID 16103 of the AP configuration information 161 describe the NAS OS 1418 on the NAS 1413. The OS quiescence program 16104 of the AP configuration information 161 denotes the presence or absence of the NAS OS quiescence program 1419.

Next, the backup management process related to this embodiment will be explained.

The backup management process in this embodiment is realizable using the respective information described hereinabove with the computer system 1' shown on FIG. 14 via the processing of FIG. 6 the same as the first embodiment. The processing of Steps 601 through 607 is realized in accordance with the backup program 156 in this embodiment. However, in this embodiment, Step 603 includes processing in accordance with the OS quiescence program 1419 of the NAS 1413 in the storage system 1410.

That is, this embodiment can utilize the same flowcharts and screens shown in FIGS. 6 through 8 and FIGS. 10 through 13 of the first embodiment.

Figure 15:
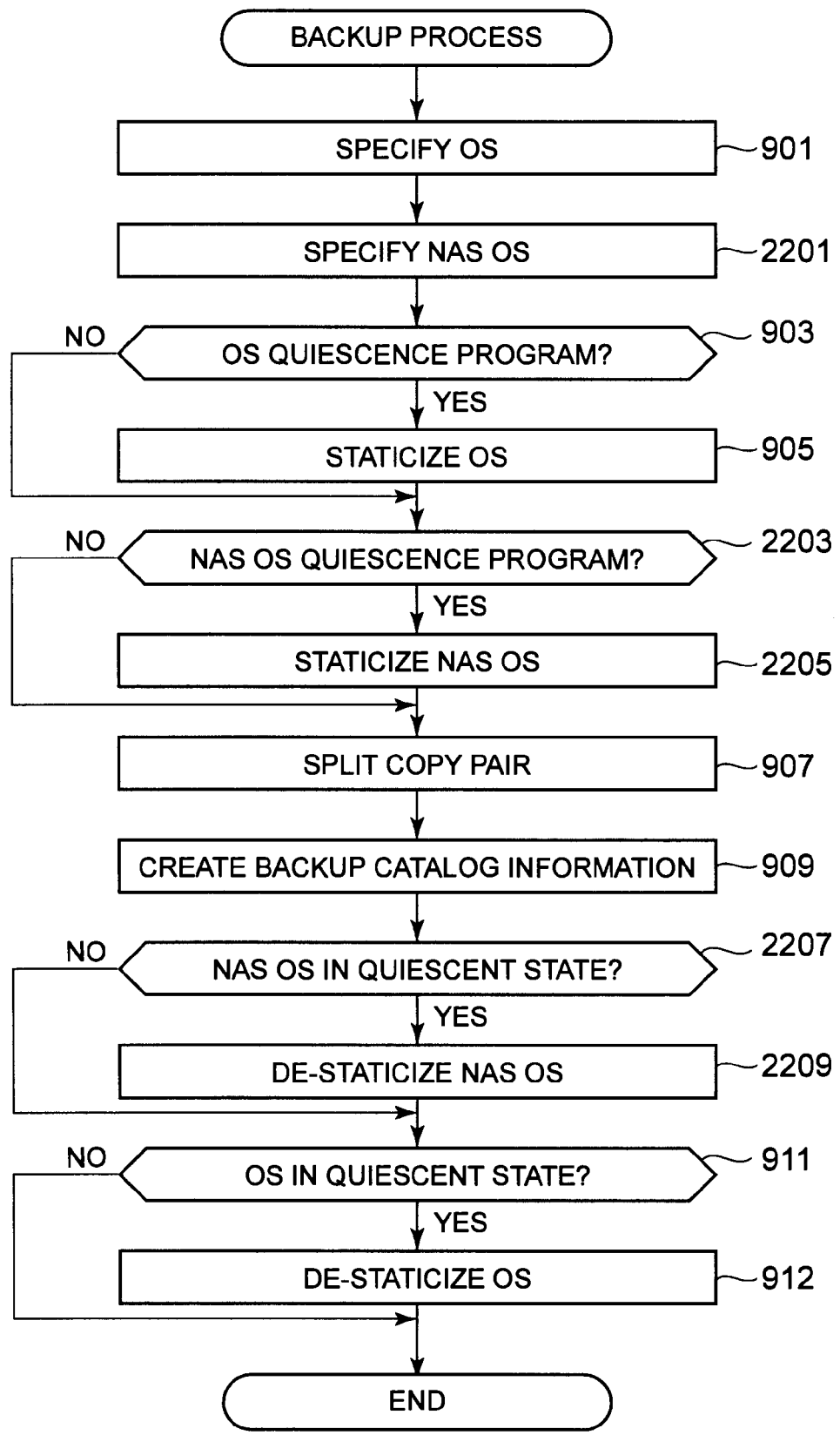
FIG. 15 is a diagram showing an example of a backup process flowchart of the second embodiment.

However, in addition to the OS 135 and OS quiescence program 136 on the host computer 130 in the first embodiment, in this embodiment, there is a NAS OS 1418 and a NAS OS quiescence program 1419 on the NAS 1413 of the storage system 1410. Accordingly, the backup process, as shown in FIG. 15, first uses the OS quiescence program of the host to staticize the OS, and thereafter, uses the NAS OS quiescence program of the NAS to staticize the NAS OS.

For this reason, the apparatus targeted for manipulation by the management computer 150 changes from the host computer 1430 to the storage apparatus 1410. Accordingly, the backup program 156 on the management computer 150 acquires the configuration information of the host computer 1430 and the storage system 1410 comprising the NAS 1413 from an agent 1436 on the host computer 1430, and creates the AP configuration information.

In Step 601 of the backup management process, the backup program 156 of the management computer 150 executes a backup condition setup process the same as in the first embodiment.

In Step 603, the backup program 156 carries out a backup process using the backup conditions set in Step 601. FIG. 15 shows an example of the backup process in this embodiment. The difference with the first embodiment will be explained hereinbelow.

In Step 2201, the backup program 156 confirms the NAS OS.

In Step 2203, the backup program 156 ascertains whether or not a NAS OS quiescence program 1419 exists in the specified NAS OS. In a case where the NAS OS quiescence program exists (Step 2203: YES), processing proceeds to Step 2205. In a case where the NAS OS quiescence program does not exist (Step 2203: NO), processing moves to Step 907.

In Step 2205, the NAS OS quiescence program 1419 is used to staticize the NAS OS specified in Step 2201.

Furthermore, in Step 2209, the NAS OS in quiescent state in Step 2205 is de-in quiescent state.

In Step 605, the alternative host computer 140 is used to carry out recovery processing for the backup data in advance. The alternative host computer 140 is equipped with the same AP 1434 and the OS 1435 of the host computer 1430 the same as in the first embodiment. Then, the alternative host computer 140 confirms the AP recovery-enabled time and corrects the backup catalog.

In the recovery process of Step 607, the user references the AP recovery-enabled time from the backup catalog and recovers the backup data.

Third Embodiment

A third embodiment differs from the first embodiment in that a virtual server (VM) is constructed in the host computer of the computer system. That is, in the third embodiment, there is described an AP backup method that is executed in accordance with the virtual server (VM).

Figure 16:
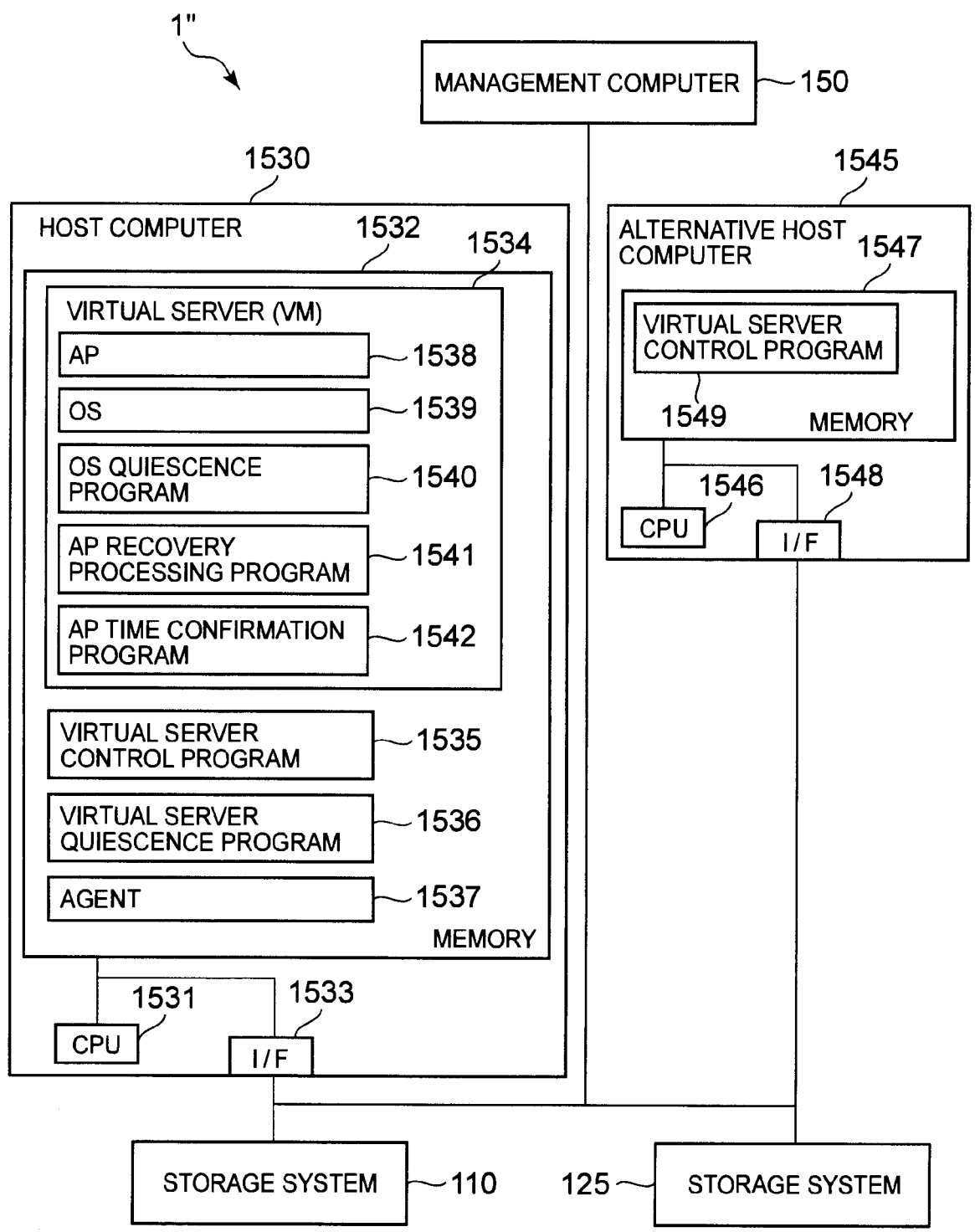
FIG. 16 is a diagram showing an example of the configuration of the computer system of a third embodiment.

FIG. 16 shows an example of a system block diagram of a computer system 1" of this embodiment. As shown in FIG. 16, the computer system of this embodiment is configured from a storage system 110; a host computer 1530; an alternative host computer 1545; and a management computer 150 the same as FIG. 1. The host computer 1530 and alternative host computer 1545, which differ from FIG. 1, will be explained below.

The host computer 1530 is configured from a CPU 1531; a memory 1532; and an I/F 1533.

The CPU 1531 is a processor for executing a program stored in the memory 1532.

The memory 1532 stores a virtual server (VM) 1534, a virtual server control program 1535, a virtual server quiescence program 1536, and an agent 1537.

The virtual server control program 1535 is for controlling the VM 1534. One or more VM 1534 may be operated from the memory 1532. Actually, a file storing an image of the VM is stored in a storage volume. An application and OS execution program are also stored in the VM image. Then, the virtual server control program 1535 reads out this file, and constructs the VM in the memory of the host computer.

The virtual server quiescence program 1536 is for staticizing the VM 1534. When backing up the VM, it is possible to staticize the backup-targeted VM in VM units.

The agent acquires the information of the host computer 1530 and the storage system 110 the same as in the first embodiment, and also has a function for acquiring the AP information and notifying same to the management computer 150.

An AP 1538, an OS 1539, an OS quiescence program 1540, an AP recovery processing program 1541, and an AP time confirmation program 1542 are constructed on the VM 1534. The AP 1538, the OS 1539, and the OS quiescence program 1540 on the VM 1534 of this embodiment respectively correspond to the AP 134, the OS 135, and the OS quiescence program 136 of the first embodiment. The AP recovery processing program 1541 and the AP time confirmation program 1542 correspond to the AP recovery processing program 146 and the AP time confirmation program 147 on the alternative host computer 140 of the first embodiment.

The AP 1538 is a program that runs on the VM 1534 of the host computer 1530 and performs a task. Either one or a plurality of AP may reside on a single VM 1534. The OS 1539 is a basic software program that runs on the VM 1534 and manages the VM in its entirety. The OS quiescence program 1540 is for staticizing the OS 1539 to maintain OS consistency. The AP recovery processing program 1541 is for carrying out an AP recovery process. The AP time confirmation program 1542 is for confirming the final update time of the AP.

The alternative host computer 1545 is configured from a CPU 1546; a memory 1547; and an I/F 1548.

The CPU 1546 is a processor for executing a program stored in the memory 1547.

The memory 1547 stores a virtual server control program 1549. The virtual server control program 1549 is for controlling the VM the same as the virtual server control program 1535 on the host computer 1530, and is able to run one or more VM 1534. Specifically, the virtual server control program 1549 reads out a VM data file stored in the volume, and constructs the VM in the memory 1547 of the alternative host computer 1545.

At the time of a recovery, the fact that the virtual server control program of the same host computer or the alternative host computer reads out and reproduces the file copied to the volume makes it possible to resume the AP in a state in which the same OS and AP as those set in the backup conditions are constructed. Therefore, only the virtual server control program needs to be stored in the memory of the alternative host computer, doing away with the need to store the same OS and AP as those in the host computer like in the first and second embodiments.

In this embodiment, which utilizes virtual server conditions, the host computer 1530 and the alternative host computer 1545 may be the same computer.

Next, the respective information referenced in this embodiment will be explained.

FIG. 17 shows an example of the backup schedule information 159 of this embodiment. The format of the backup schedule information 159 disclosed in FIG. 17 is an example, and the present invention is not limited to the format shown in FIG. 17. FIG. 17 differs from FIG. 2 of the first embodiment in that a VM ID 15905 has been added. Therefore, the backup schedule information 159 is configured from the schedule ID 15901, the backup start time 15902, the OS ID 15903, the copy pair ID 15904 and the VM ID 15905. The VM ID 15905 stores information (for example, an identifier) for identifying a backup-targeted VM.

FIG. 18 shows an example of the backup catalog information 160 of this embodiment. The format of the backup catalog information 160 disclosed in FIG. 18 is an example, and the present invention is not limited to the format shown in FIG. 18. FIG. 18 differs from FIG. 3 of the first embodiment in that a VM ID 16007 has been added. Therefore, the backup catalog information 160 is configured from the backup ID 16001, the OS ID 16002, the VM ID 16007, the backup time 16003, the AP ID 16004, the AP recovery-enabled time 16005, and the backup data storage volume ID 16006. The information for the backup ID 16001, the AP ID 16004, the AP recovery-enabled time 16005, and the backup data storage volume ID 16006 are acquired here the same as in FIG. 3 of the first embodiment. The information for the VM ID 16007 is acquired from the VM ID 15904 of the backup schedule information 159 of FIG. 17. The information for the backup time 16003 is acquired from the backup start time 15902 of the backup schedule information 159 of FIG. 17. Further, in a case where only OS quiescence is executed at backup, the backup time 16003 may be set to the OS quiescence time, in a case where only VM quiescence is executed at backup, the backup time 16003 may be set to the VM quiescence time, and in a case where OS and VM quiescences are executed at backup, the backup time 16003 may be set to the VM quiescence time. Making the VM quiescence time the backup time 16003 when both OS and VM quiescences are executed is due to the fact that VM quiescence is normally executed subsequent to OS quiescence.

FIG. 19A and FIG. 19B show examples of the AP configuration information 161 of this embodiment. The formats of the AP configuration information 161 disclosed in FIG. 19A and FIG. 19B are examples, and the present invention is not limited to the formats shown in FIG. 19A and FIG. 19B. FIG. 19A and FIG. 19B differ from FIG. 4 of the first embodiment in that a VM ID 16111 and a VM quiescence program 16112 have been added. Therefore, the AP configuration information 161 is configured from the AP ID 16101, the host ID 16102, the OS ID 16103, the OS quiescence program 16104, the VM ID 16111, the VM quiescence program 16112, the storage ID 16105, the used-VOL ID 16106, the RPO 16107, the RPO correction 16108, and the recovery data save 16109. The VM ID 16111 stores information (for example, an identifier) for identifying the backup-targeted VM. The VM quiescence program 16112 stores information denoting whether or not there is a virtual server quiescence program 1536, which is the program for staticizing the backup-targeted VM. The backup program acquires the information of the VM ID 16111 and the VM quiescence program 16112 from the agent 1537 on the host computer 1530 and stores same.

The storage management information 120 stored in the memory of the storage system 110 is the same as that of FIG. 5, and is referenced by the backup program 156 executed on by the management computer 150.

<Backup Process>

Next, the backup process related to this embodiment will be explained.

The backup process of this embodiment is realized via the processing of FIG. 6 the same as in the first embodiment using the computer system shown in FIG. 16, the backup schedule information 159 of FIG. 17, the backup catalog information 160 of FIG. 18, and the AP configuration information 161 of FIG. 19. In FIG. 6, the processing of Steps 601 through 607 is realized by the backup program 156 in accordance with this embodiment. However, this processing differs from that of the first embodiment in that Step 603 includes processing in accordance with the OS quiescence program 1540 and the virtual server quiescence program 1536 on the host computer 1530. Step 605 includes processing in accordance with the virtual server program 1549, the AP recovery processing program 1546, and the AP time confirmation program 1547 on the alternative host computer 1545.

Figure 20:
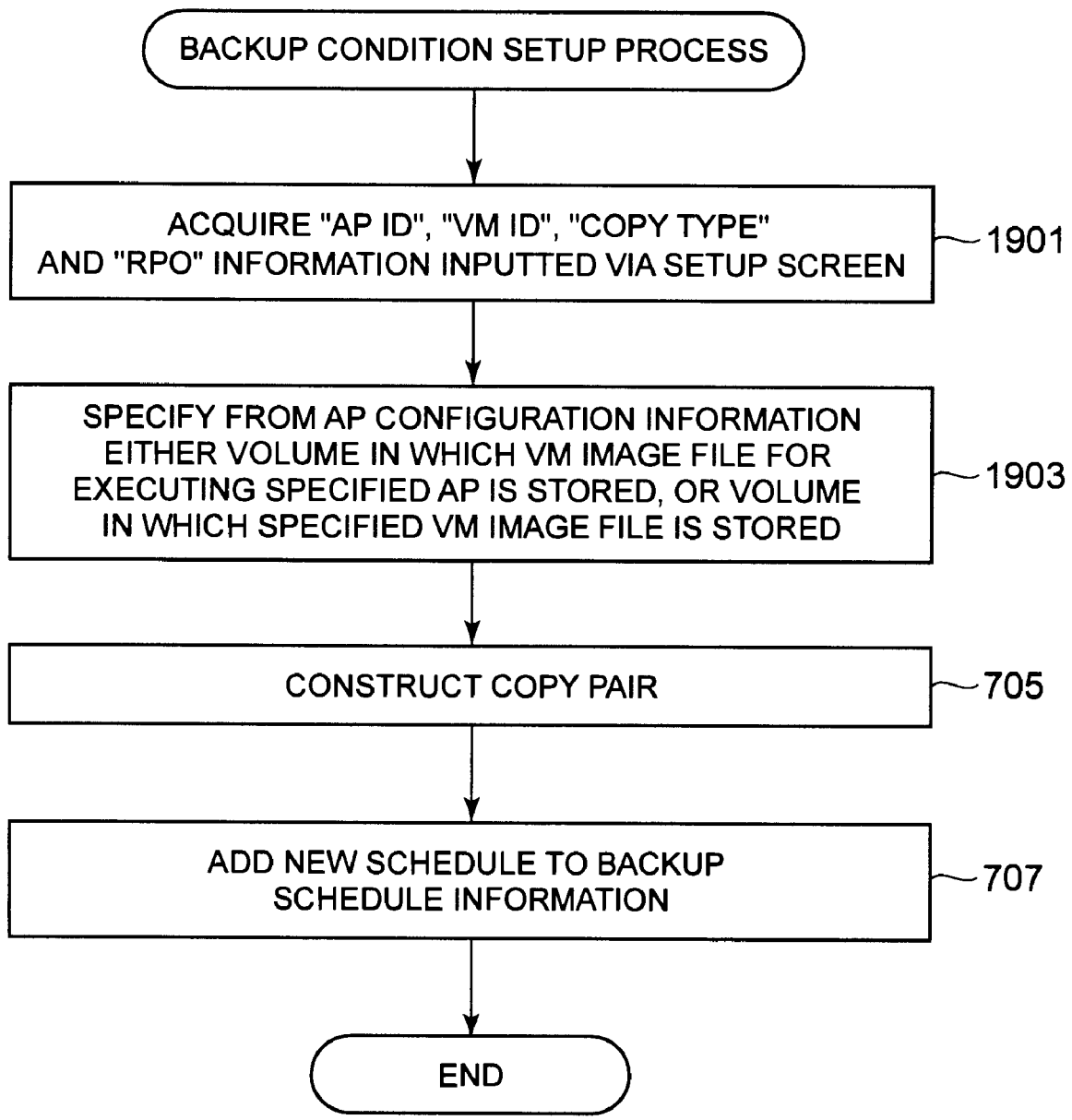
FIG. 20 is a diagram showing an example of a backup condition setup process flowchart of the third embodiment.

FIG. 20 shows an example of the backup condition setup process of this embodiment. In this embodiment, the AP and the VM may be specified as the backup target. For example, in a case where the user specifies the AP as the backup target, the VM on which the AP is executed is retrieved, and a backup of the volume in which the image file of this VM is stored is executed. In a case where the user specifies the VM as the backup target, a backup of the volume in which the image file of this VM is stored is executed. Steps 1901 and 1902 of FIG. 20 are different from FIG. 7 of the first embodiment. The different steps will be explained below.

In Step 1901, the backup program 156 acquires the information of either the AP ID or VM ID inputted by the user, and the copy type, RPO and so forth from the backup condition setup screen. Then, based on the acquired information, the backup program 156 corrects the AP configuration information 161.

When the AP was specified as the backup target in Step 1901, in Step 1903, the backup program 156 uses the AP configuration information 161 to retrieve the AP ID corresponding to the AP ID acquired in Step 1901. Then, the used-VOL ID 16106 of the AP configuration information 161 is referenced, and the volume which stores the image file of the VM on which the retrieved AP ID is to be executed is specified. When the VM is specified as the backup target in Step 1901, the backup program 156 uses the AP configuration information 161 to retrieve the VM ID corresponding to the VM ID acquired in Step 1901. Then, the used-VOL ID 16106 of the AP configuration information 161 is referenced, and the volume that stores the image file of the VM of the retrieved VM ID is specified.

Figure 21:
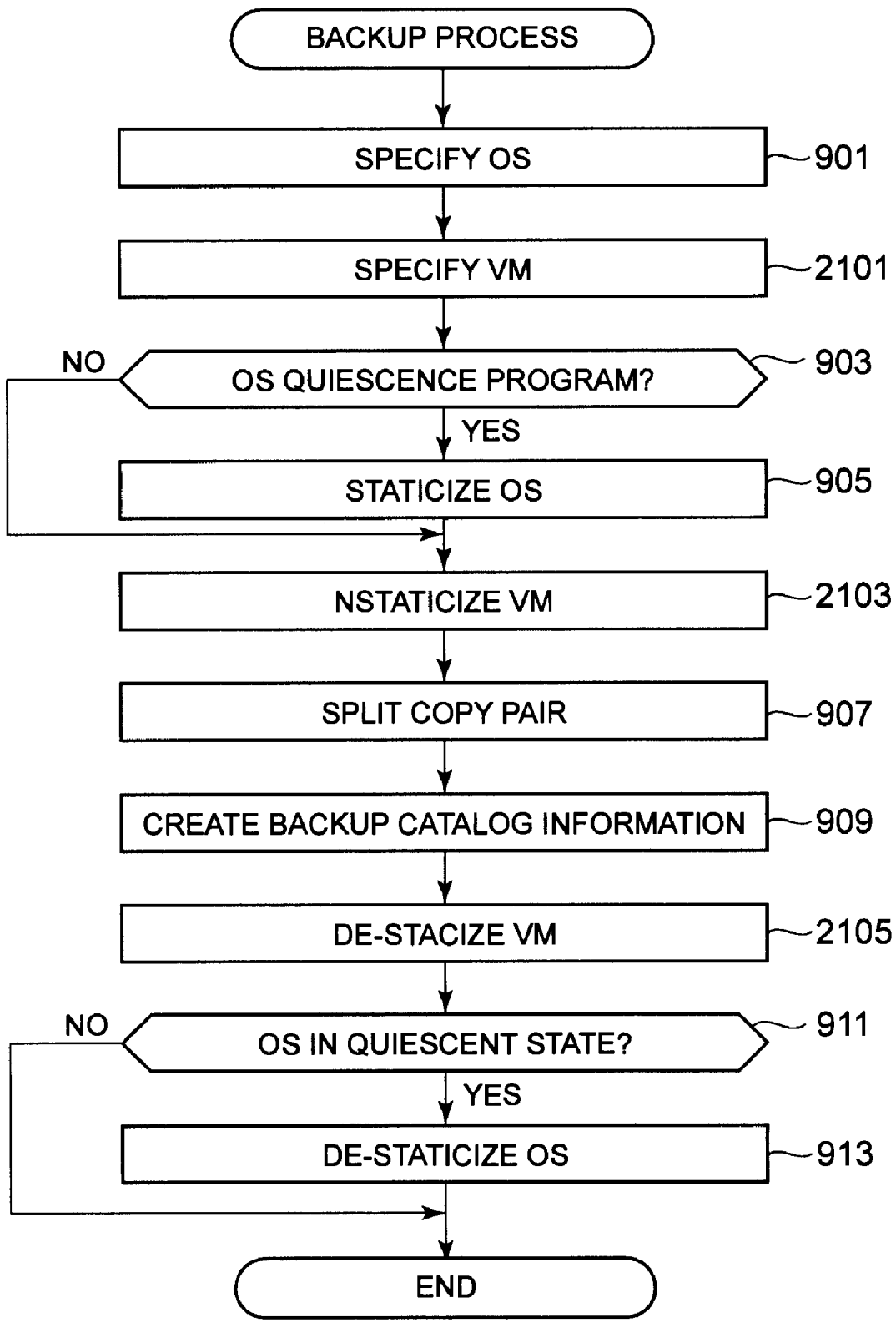
FIG. 21 is a diagram showing an example of a backup process flowchart of the third embodiment.

FIG. 21 shows an example of the backup process of this embodiment. The backup program 156 carries out the backup process based on the conditions set in Step 601 and the backup schedule information 159. Each backup process is executed at the backup start time 15901 of the backup schedule information 159. However, a backup process may also be executed on-demand. This backup process differs from that of the first embodiment in that either the VM on which the backup-targeted AP is executed or the backup-targeted VM is specified, and a VM quiescence process is executed. The different steps will be explained below.

In Step 2101, the backup program 156 confirms either the VM on which the backup-targeted AP is executed or the backup-targeted VM. Specifically, specifies the VM that is to be in quiescent state from the VM ID 15905 of the backup schedule information 159 is specified.

In Step 2103, the VM quiescence program 136 is used to staticize the VM specified in Step 2101. If the VM quiescence process is not performed, the file will be in use and resumption by the alternative host computer 1545 will be impossible, eliminating the possibility of a recovery process being carried out.

In Step 2105, the VM in quiescent state in Step 2103 is de-in quiescent state.

Figure 22:
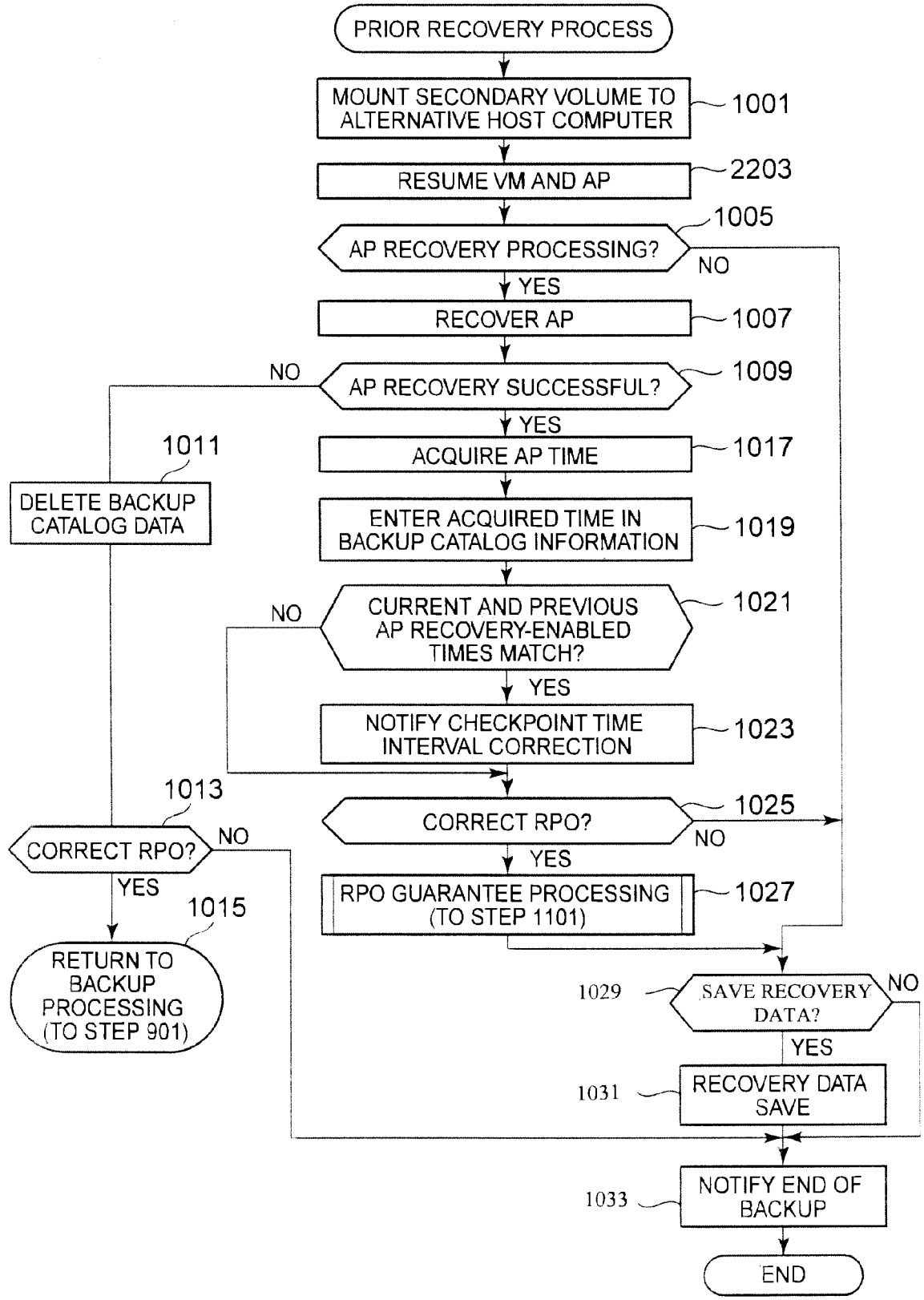
FIG. 22 is a diagram showing an example of a prior recovery process flowchart of the third embodiment.

FIG. 22 shows an example of a prior recovery process of this embodiment. Step 2203 is the only difference compared to FIG. 1 of the first embodiment. The different step will be explained below.

In Step 2203, the virtual server control program 1549 reads out the image file of the VM in which the secondary volume is stored, and constructs (resumes) the VM. In the case of the VM, the log describing the AP processing is also stored in the VM image that has been backed up. Even in a case in which backup was performed while an AP transaction process was in progress, transaction processing may resume from the in-progress state when the VM resumes. In accordance with this, the AP completes the transaction process and consistency is maintained at a future time with respect to the AP backup time. The backup program may update the AP recovery-enabled time 16005 of the backup catalog information using this time as the recovery-enabled time.

The third embodiment has shown a case in which the backup process of the present invention is applied to a computer system having a host computer in which an AP is executed on a virtual server.

Fourth Embodiment

A fourth embodiment differs from the third embodiment in that it employs a computer system configuration that utilizes a VM file-level copy function.

The computer system of this embodiment is the same as that of FIG. 16, which shows the system configuration of the third embodiment. However, the virtual server control program 1535 has a host-based copy function.

The portions of the various types of information used in a backup configuration construction process of this embodiment that differ from the information recorded in the respective information of FIG. 5 and FIGS. 17 through 19 of the third embodiment will be explained. The main differences lie in file specification rather than volume specification, and in the use of a host-based copy function rather than a storage copy function.

Specifically, a file ID is stored in the volume ID 12012 of the volume information 1201 in the storage management information 120 of FIG. 5. Also, a primary file ID is stored in the primary VOL ID 12023, and a secondary file ID is stored in the secondary VOL ID 12025 of the copy pair information 1202.

A backup data storage file ID is stored in the backup data storage volume ID 16007 of the backup catalog information 160 of FIG. 18.

A used-file ID is stored in the used-VOL ID 16108 of the AP configuration information 161 of FIG. 19.

Next, the backup process related to this embodiment will be explained. The backup management process in this embodiment is the same as that of the third embodiment.

Figure 23:
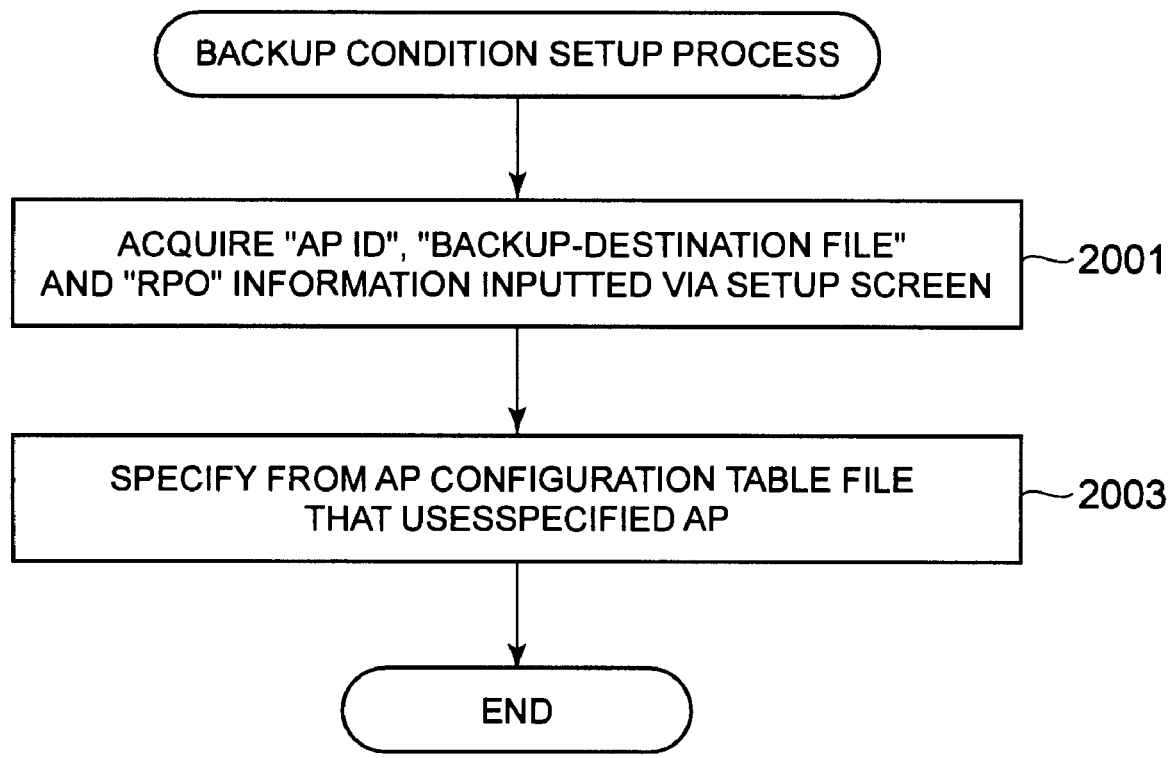
FIG. 23 is a diagram showing an example of a backup condition setup process flowchart of a fourth embodiment.

FIG. 23 shows an example of the flow of the backup condition setup process of this embodiment. The backup program 156 receives a backup request from the user, displays the backup condition setup screen, and commences processing.

In Step 2001, the backup program 156 acquires the inputted AP ID and RPO information from the backup condition setup screen. A backup destination file may be a file destination specified by the user, or an automatically selected backup destination. The backup program 156 corrects the AP configuration table 161 based on the acquired information.

The difference with FIG. 8, which is one example of the backup condition setup screen, will be described. The configuration comprising the item 801 for specifying the AP ID that determines the backup target, the information 802 for inputting a backup policy, the set button 808, and the cancel button 809 for canceling the backup condition settings is the same as FIG. 8. In the backup policy information 802, the copy type 803 item has been deleted, and the respective items RPO 804, RPO correction process 805, and prior recovery data save process 806 have been provided. An item for a backup destination file may also be added here.

In Step 2003, the AP configuration information 161 is used, the used-file ID 405 item from the acquired AP ID is referenced, and the file in which the VM image file is stored is specified. Because a host-based copy function is used in this embodiment, the backup source and backup destination files are specified without constructing a copy pair.

Figure 24:
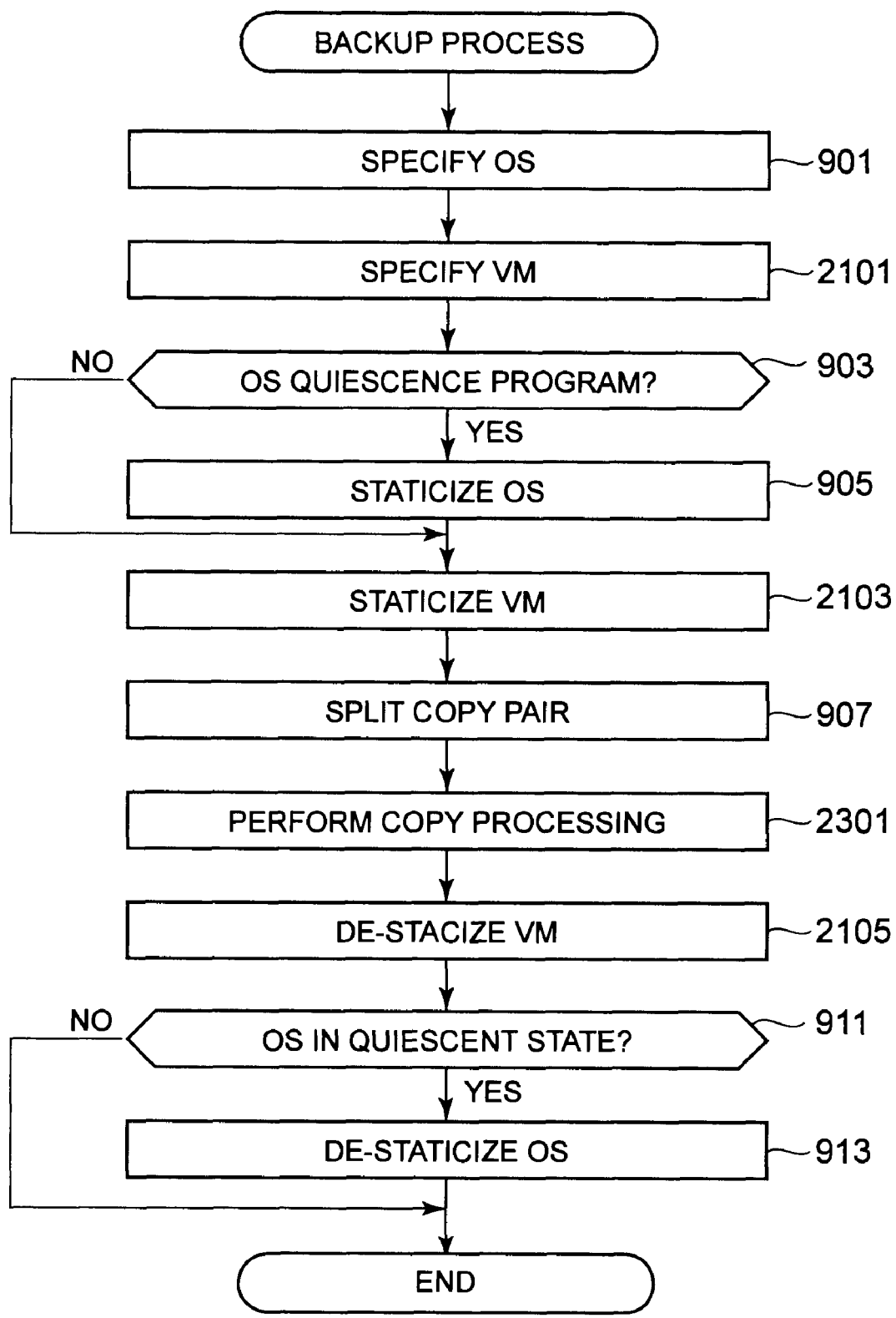
FIG. 24 is a diagram showing an example of a backup process flowchart of the fourth embodiment.

FIG. 24 shows an example of the backup process of this embodiment. Step 2301 is the only difference with the flow of processing of FIG. 19 of the third embodiment. The backup program 156 references the conditions created via the backup condition setup process of FIG. 23 and the backup schedule information 159, and carries out the backup process. Specifically, the backup process is executed at the backup start time 15902 of the backup schedule information 159. However, the backup process may also be executed on-demand. The points that differ from the processing flow of FIG. 21 will be explained below.

In Step 2301, instead of a copy split process, the management computer 150 uses the backup program 156 to execute a host-based data copy for the specified file to the specified the backup destination.

The prior recovery process is the same as that of the third embodiment. However, in Step 1001, the backup destination file is mounted instead of the secondary volume.

Fifth Embodiment

A fifth embodiment differs from the third embodiment in that there is a plurality of alternative host computers 1545 for carrying out a prior recovery process.

The computer system configuration is the same as that of FIG. 16, except that there is a plurality of alternative host computers. Since there is a plurality of alternative host computers that are able to execute the prior recovery process in this case, the available alternative host computer is managed.

The various types of information used in this embodiment are the same as those of FIGS. 17 through 19. In this embodiment, alternative host computer information is also stored in the memory 152 of the management computer 150.

Figure 25:
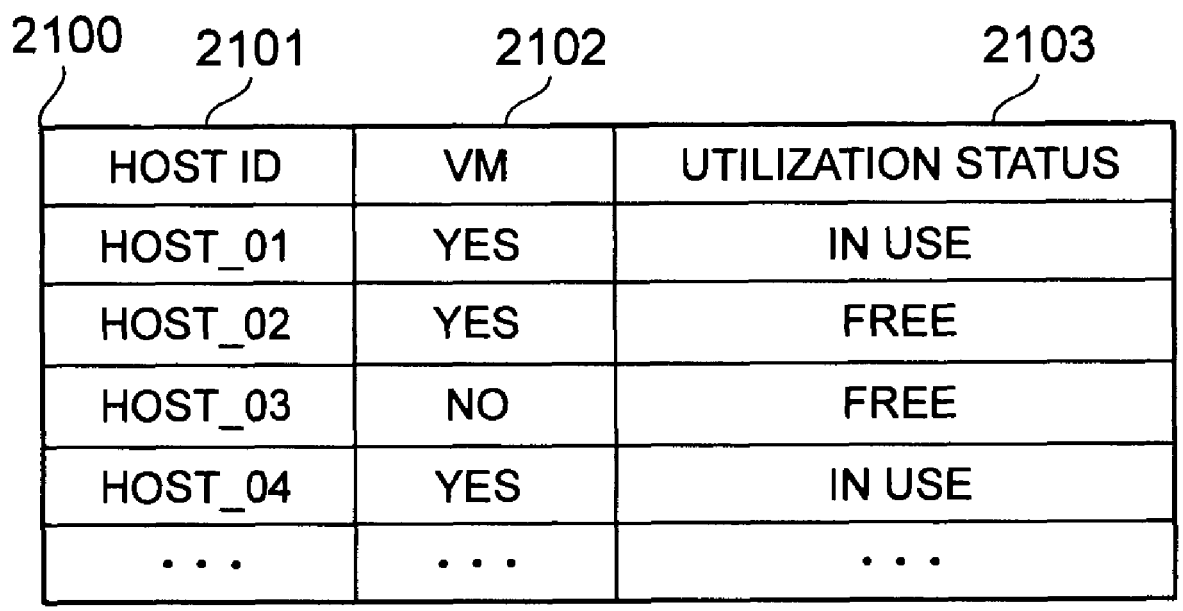
FIG. 25 is a diagram showing an example of alternative host computer information of a fifth embodiment.

FIG. 25 shows an example of alternative host computer information 2100 of this embodiment. The alternative host computer information 2100 stores a host ID 2101, a VM 2102, and a utilization status 2103. The host ID 2101 stores information for identifying the alternative host computer. The VM 2102 stores information denoting whether or not the alternative host computer has a virtual server control program. The utilization status 2103 stores information as to whether or not the alternative host computer is being used for prior recovery processing.

The differences in the prior recovery process compared to that of the third embodiment will be explained below.

Step 1001 differs from the prior recovery process shown in FIG. 22.

In Step 1001, the alternative host computer information 2100 is referenced, and the alternative host computer, for which information denoting "yes" for the virtual server control program is stored in the VM 2102 and information denoting "free" is stored in the utilization status 2103, is retrieved. Then, the secondary volume is mounted to the retrieved alternative host computer.

There is a plurality of alternative host computers, and managing the utilization statuses thereof like this makes it possible to allocate a prior recovery process to a plurality of alternative host computers, and to balance the load.

What is claimed is:

1. A computer system, comprising:
    a first host computer that executes an application;
    a second host computer;
    a storage system, which is coupled to the first host computer and the second host computer, and which includes a plurality of storage apparatuses that form a plurality of volumes including a first volume allocated to the application; and
    a management computer, which is coupled to the first host computer, the second host computer and the storage system, and which holds backup schedule information for managing a first time for starting a backup of the first volume, and backup catalog information for managing information related to a backup result,
    wherein the management computer references the backup schedule information, issues a first instruction to the storage system at the first time, and issues a second instruction to the second host computer after issuing the first instruction,
    wherein the storage system, in response to the first instruction, backs up the first volume to a second volume at the first time while the first host computer continues to process the application,
    the second host computer, in response to the second instruction, reads out data of the second volume and acquires a second time, which is the time at which the application is recovery-enabled, and
    the management computer stores the second time with identification information of the first volume backup in the backup catalog information,
    wherein the first host computer has a virtual server control program for controlling a virtual server that executes an application, and comprises a cache memory for temporarily storing data,
    the second host computer has the virtual server control program that the first host computer has, and uses the virtual server control program when acquiring the second time, which is the time at which the application is recovery-enabled,
    in a case where the second host computer is unable to read out the second volume and recover the application in response to the second instruction, the management computer deletes the information included in the backup catalog information and related to the identifier, and also issues an instruction to the storage system to delete the second volume,
    the management computer stores a third time, which is obtained by adding a preset RPO value to the second time, in the backup schedule information as a time at which the first volume is to be backed up to a third volume subsequent to the first time, and
    in a case where the second time matches the time at which the application is recovery-enabled based on data that has been backed up from the first volume to another volume prior to the first time, the management computer changes a time interval during which data is migrated from the cache memory to the first volume.

2. The computer system according to claim 1, wherein the management computer further comprises an output device for outputting a relationship between the identification information and the second time.

3. The computer system according to claim 1, wherein in a case where the second host computer executes an application recovery by reading out the second volume in response to the second instruction, the second host computer writes the recovered data to a third volume of the storage system.

4. The computer system according to claim 1, wherein the second host computer comprises a plurality of host computers,
    the management computer has information for managing the utilization statuses of the plurality of host computers, and issues a second instruction to a host computer that is not being used of the plurality of host computers, and
    in response to the second instruction, the host computer that is not being used reads out the second volume and acquires the second time, which is the time at which the application is recovery-enabled.

5. The computer system according to claim 1, wherein the first and second host computer has a virtual server control program for controlling a virtual server that executes an application, and
    the second host computer acquires the second time by executing a recovery process of the application by activating the virtual server based on backup data stored in the second volume.

6. A backup method by a management computer, which is coupled to a first host computer for executing an application, a second host computer, and a storage system having a plurality of storage apparatuses that form a plurality of volumes including a first volume allocated to the application, wherein the first host computer has a virtual server control program for controlling a virtual server that executes an application, and comprises a cache memory for temporarily storing data, the backup method comprising the steps of:
    holding backup schedule information for managing a first time for starting a backup of the first volume, and backup catalog information for managing information related to a backup result,
    issuing an instruction to the storage system to back up the first volume to a second volume at the first time while the first host computer continues to process the application,
    the second host computer reading out data of the second volume and acquiring a second time, which is the time at which the acquired application is recovery-enabled,
    storing a relationship between identification information of the first volume backup and the second time in the backup catalog information,
    using, by the second host computer which has the virtual server control program that the first host computer has, the virtual server control program to acquire the second time, which is the time at which the application is recovery-enabled,
    deleting, by the management computer in a case where the second host computer is unable to read out the second volume and recover the application in response to the second instruction, the information included in the backup catalog information and related to the identifier, and issuing an instruction to the storage system to delete the second volume, storing, by the management computer, a third time which is obtained by adding a preset RPO value to the second time, in the backup schedule information as a time at which the first volume is to be backed up to a third volume subsequent to the first time, and changing, by the management computer, in a case where the second time matches the time at which the application is recovery-enabled based on data that has been backed UP from the first volume to another volume prior to the first time, a time interval during which data is migrated from the cache memory to the first volume.

7. The backup method according to claim 6, wherein the first and second host computer has a virtual server control program for controlling a virtual server that executes an application, the backup method further comprising the step of:

acquiring, by the second host computer, the second time by executing a recovery process of the application by activating the virtual server based on backup data stored in the second volume.

* * * * *